(12) United States Patent
Urakabe et al.

(10) Patent No.: US 7,729,144 B2
(45) Date of Patent: Jun. 1, 2010

(54) DC/DC POWER CONVERSION DEVICE

(75) Inventors: Takahiro Urakabe, Tokyo (JP); Matahiko Ikeda, Tokyo (JP); Masaru Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 228 days.

(21) Appl. No.: 12/060,542

(22) Filed: Apr. 1, 2008

(65) Prior Publication Data
US 2008/0253156 A1 Oct. 16, 2008

(30) Foreign Application Priority Data
Apr. 12, 2007 (JP) ............................. 2007-104520

(51) Int. Cl.
*H02M 7/00* (2006.01)
(52) U.S. Cl. .................... 363/71; 323/272; 323/284; 323/285
(58) Field of Classification Search ............... 363/65, 363/71; 323/271, 272, 282, 284, 285
See application file for complete search history.

(56) References Cited

U.S. PATENT DOCUMENTS

| | | | | |
|---|---|---|---|---|
| 6,031,361 A | * | 2/2000 | Burstein et al. | 323/224 |
| 6,100,676 A | * | 8/2000 | Burstein et al. | 323/283 |
| 6,198,261 B1 | * | 3/2001 | Schultz et al. | 323/272 |
| 6,268,716 B1 | * | 7/2001 | Burstein et al. | 323/272 |
| 6,281,666 B1 | * | 8/2001 | Tressler et al. | 323/272 |
| 6,853,169 B2 | * | 2/2005 | Burstein et al. | 323/272 |
| 6,954,366 B2 | * | 10/2005 | Lai et al. | 363/71 |
| 7,596,008 B2 | * | 9/2009 | Iwata et al. | 363/71 |

FOREIGN PATENT DOCUMENTS

| | | |
|---|---|---|
| JP | 9-191638 | 7/1997 |
| JP | 2006-262619 | 9/2006 |

OTHER PUBLICATIONS

U.S. Appl. No. 12/441,025, filed Mar. 12, 2009, Ikeda et al.
U.S. Appl. No. 12/439,829, filed Mar. 4, 2009, Urakabe et al.
U.S. Appl. No. 12/059,109, filed Mar. 31, 2008, Urakabe et al.

* cited by examiner

*Primary Examiner*—Bao Q Vu
(74) *Attorney, Agent, or Firm*—Oblon, Spivak, McClelland, Maier & Neustadt, L.L.P.

(57) ABSTRACT

A DC/DC power conversion device with smoothing capacitors including three column circuits share the smoothing capacitors to be connected in parallel, each column circuit have a plurality of circuits connected in series where two MOSFETs are connected in series between both ends of respective smoothing capacitors and LC serial bodies of capacitors and inductors with the same resonant cycle are disposed between the circuits at two middle terminals. Driving signals for the respective column circuits have the same driving cycle identical with the resonant cycle of the LC serial bodies, and are out of phase with each other by $2\pi/3$(rad), and thus charge-discharge currents towards the smoothing capacitors are circulated among the column circuits and ripple currents flowing through the smoothing capacitors are reduced.

10 Claims, 12 Drawing Sheets

DC/DC POWER CONVERSION DEVICE

BACKGROUND OF THE INVENTION

1. Field of the Invention

The present invention relates to a DC/DC power conversion device for converting a DC voltage into a boosted or deboosted DC voltage.

2. Description of the Background Art

Japanese Publication of Patent Application H9-191638 discloses a DC/DC converter as a conventional DC/DC power conversion device which is comprised of inverter circuits including semiconductor switches connected to a voltage with a positive polarity (hereinafter, abbreviated to "positive voltage") and semiconductor switches connected to a voltage with a negative polarity (hereinafter, abbreviated to "negative voltage") and multiplier-rectifier circuits including a plurality of rectifiers connected in series and a plurality of capacitors connected in series. The inverter circuits generate alternating current (AC) voltages and the multiplier-rectifier circuits generate high DC voltages to a load.

Further, Japanese Publication of Patent Application 2006-262619 discloses a switched capacitor converter as a conventional DC/DC converter of another example which includes capacitors and inductors connected in series between a low voltage sided DC power supply and a high voltage sided DC power supply, and a plurality of semiconductor switching elements comprising cells for transferring energy between two power supplies. The n (n is an integer of 2 or more) cells are connected in parallel and driving signals for driving the semiconductor switching elements belonging to each cell are out of phase with each cell and the phase difference therebetween is $2\pi/n$. This reduces ripple currents flowing through smoothing capacitors connected between respective input terminals and output terminals, thereby decreasing capacitances thereof.

Such conventional DC/DC power conversion devices perform a DC/DC power conversion using charge-discharge of capacitors and, according to the device disclosed in JP2006-262619, the plurality of cells are connected in parallel and the driving signals are out of phase and thus a structure of the device can be promoted to be small-sized by reducing the ripple currents flowing through the smoothing capacitors connected between the respective input terminals and the output terminals. However, the DC/DC power conversion device disclosed in JPH9-191638 is provided with the smoothing capacitors connected in parallel in the respective circuits such as the inverter circuits and the rectifier circuits. For this reason, although the DC/DC power conversion device is assumed as one cell to be comprised of a plurality of cells and to be out of phase with the cells connected in parallel like that disclosed in JP2006-262619, there is a problem that the ripple currents flowing through the smoothing capacitors connected in parallel in the respective circuits are not reduced.

SUMMARY OF THE INVENTION

The present invention is directed to solve such problems and to provide a DC/DC power conversion device with smoothing capacitors disposed in parallel in each of a plurality of circuits including inverter circuits for driving and rectifier circuits and with use of charge-discharge of capacitors for energy transfer. Furthermore, the present invention is directed not only to make the device small-sized and also to increase reliability thereof by reducing ripple currents flowing through the respective smoothing capacitors disposed in parallel in each of the plurality of circuits and thereby decreasing capacitances of the smoothing capacitors.

A first DC/DC power conversion device according to the present invention comprises a plurality of smoothing capacitors and n column circuits (n is an integer of 2 or more) sharing to be connected in parallel. Each column circuit includes a plurality of circuits formed by connecting in series inverter circuit(s) for driving and rectifier circuit(s), and capacitors for energy transfer. Each inverter circuit is formed by connecting in series a high voltage sided element and a low voltage sided element, each element is made of semiconductor switching element, and by connecting them between both terminals of the smoothing capacitor. And each rectifier circuit is formed by connecting in series a high voltage sided element and a low voltage sided element, each element is made of a semiconductor switching element or a diode element, and by connecting them between both terminals of the smoothing capacitor. In each column circuit, the capacitors for energy transfer are connected respectively between the circuits among the plurality of circuits in such manner that each capacitor is connected between two middle terminals such as middle terminals corresponding to contact points of the high voltage sided elements and the low voltage sided elements in the respective circuits. Driving signals for the respective column circuits have the same driving cycle and are out of phase with each other.

In DC/DC power conversion devices according to the present invention, column circuits each comprised of the plurality of circuits share smoothing capacitors to be connected in parallel, and driving signals for the respective column circuits have the same driving cycle and are out of phase with each other, and thereby ripple currents flowing through the respective smoothing capacitors can be reduced. Therefore, a heat-emission of the smoothing capacitors is restricted and reliability is increased and thereby efficiency for conversion is increased. Also, capacitances of the smoothing capacitors are reduced and a structure of the device can be promoted to be made small-sized.

The foregoing and other objects, features, aspects and advantages of the present invention will become more apparent from the following detailed description when read in conjunction with the accompanying drawings.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principle of the invention.

DETAILED DESCRIPTION OF THE PREFERRED EMBODIMENTS OF THE INVENTION

Hereinafter, embodiments of the present invention will be described with reference to the accompanying drawings.

First Embodiment

A DC/DC power conversion device according to the first embodiment will be now described.

Figure 1:
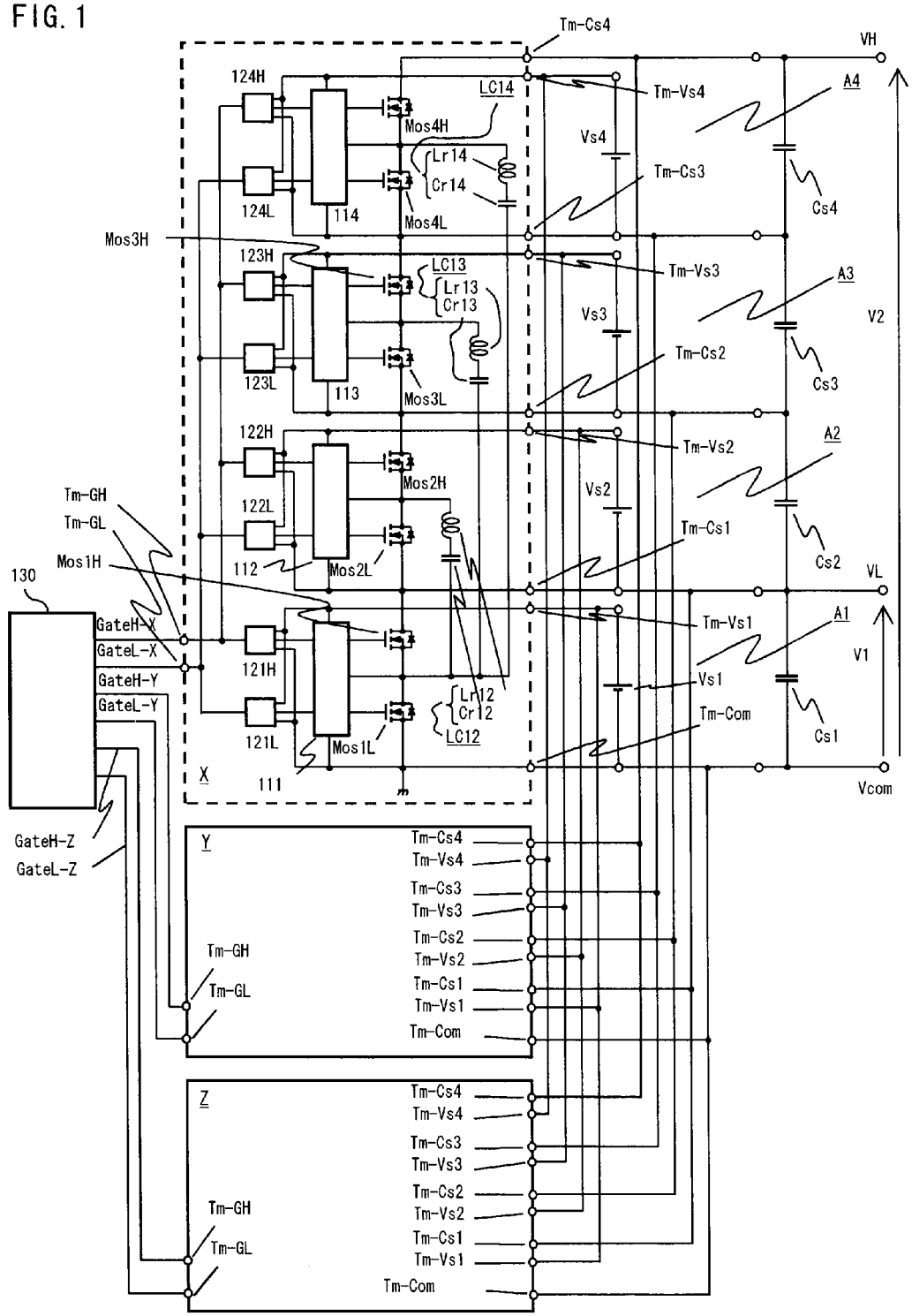
FIG. 1 is a block diagram to represent a circuital structure of a DC/DC power conversion device according to a first embodiment.

FIG. 1 is a block diagram to represent a circuital structure of a DC/DC power conversion device according to the first embodiment.

As shown in FIG. 1, the DC/DC power conversion device includes three column circuits X, Y and Z each comprised of circuits A1 to A4 of a plurality of stages (in this case, four stages), voltage sources Vs1, Vs2, Vs3 and Vs4 for driving, smoothing capacitors Cs1, Cs2, Cs3 and Cs4 for smoothing input and output voltages and further functioning as voltage sources for energy transfer, a control circuit 130, and input and output voltage terminals Vcom, VL and VH. The DC/DC power conversion device has a function to convert a voltage V1 input across the voltage terminals VL and Vcom into a boosted voltage V2 about four times higher than the voltage V1 for output across the voltage terminals VH and Vcom.

Each of the column circuits X, Y and Z is a DC/DC converter having a function to convert the voltage V1 input across the voltage terminals VL and Vcom into the boosted voltage V2 about four times higher than the voltage V1 for output across the voltage terminals VH and Vcom, the description of which will be made below. For convenience of explanation, although a circuital structure for the column circuit X is only shown, those for the column circuits Y and Z are the same, too.

Referring FIG. 1, the column circuit X (Y and Z) is constructed by connecting in series two MOSFETs Mos1L and Mos1H, Mos2L and Mos2H, Mos3L and Mos3H, and Mos4L and Mos4H as a low voltage sided element and a high voltage sided element, and by connecting in series the four-stage circuits A1, A2, A3 and A4 connected between both terminals of the respective smoothing capacitors Cs1, Cs2, Cs3 and Cs4. Respective LC serial bodies LC12, LC13 and LC14 (hereinafter, capacitors Cr12, Cr13 and Cr14 and inductors Lr12, Lr13 and Lr 14 connected in series are referred to as "LC serial bodies") play a part in transferring energy. The LC serial bodies LC12, LC13 and LC14 are connected between two middle terminals such as middle terminals corresponding to contact points of two MOSFETs in each circuit A1, A2, A3 and A4 and the middle terminals of the circuit A1 comprising a predetermined circuit and the remaining respective circuits A2, A3 and A4. A resonant cycle determined by an inductance of the inductor Lr and a capacitance of the capacitor Cr in the respective stages is set to be identical in every stage.

Each MOSFET is a power MOSFET with a parasitic diode formed between a source and a drain thereof.

Moreover, the column circuit X (Y and Z) includes gate driving circuits 111 to 114 and photocouplers 121L and 121H to 124L and 124H for driving the MOSFETs in the respective circuits A1, A2, A3 and A4, and further includes gate signal input terminals Tm-GL and Tm-GH and power input terminals or terminals for connection of the smoothing capacitors Tm-Com, Tm-Vs1 to Tm-Vs4 and Tm-Cs1 to Tm-Cs4.

The voltage sources Vs1, Vs2, Vs3 and Vs4 shared by the respective column circuits X, Y and Z are provided for driving the MOSFETs of the respective column circuits X, Y and Z, the gate driving circuits 111 to 114 and the photocouplers 121L and 121H to 124L and 124H, with respect to the source terminals of the respective MOSFETs Mos1L, Mos2L, Mos3L and Mos4L.

Subsequently, connection relationship of the DC/DC power conversion device will be described in detail.

A low voltage sided terminal of the smoothing capacitor Cs1 is connected to the voltage terminal Vcom, a negative voltage terminal of the voltage source Vs1 and the terminals Tm-Com of the respective column circuits X, Y and Z. A high voltage sided terminal of the smoothing capacitor Cs1 is connected to the voltage terminal VL, a low voltage sided terminal of the smoothing capacitor Cs2, a negative voltage terminal of the voltage source Vs2 and the terminals Tm-Cs1 of the respective column circuits X, Y and Z. A high voltage sided terminal of the smoothing capacitor Cs2 is connected to a low voltage sided terminal of the smoothing capacitor Cs3, a negative voltage terminal of the voltage source Vs3 and the terminals Tm-Cs2 of the respective column circuits X, Y and Z. A high voltage sided terminal of the smoothing capacitor Cs3 is connected to a low voltage sided terminal of the smoothing capacitor Cs4, a negative voltage terminal of the voltage source Vs4 and the terminals Tm-Cs3 of the respective column circuits X, Y and Z. A high voltage sided terminal of the smoothing capacitor Cs4 is connected between the voltage terminal VH and the terminals Tm-Cs4 of the respective column circuits X, Y and Z. Positive voltage terminals of the respective voltage sources Vs1 to Vs4 are connected to the terminals Tm-Vs1 to Tm-Vs4 of the respective column circuits X, Y and Z.

Connection relationship in the respective column circuits is as follows.

The source terminal of the MOSFET Mos1L is connected to the terminal Tm-Com, the drain terminal of the MOSFET Mos1H and the source terminal of the MOSFET Mos2L are connected to the terminal Tm-Cs1, and the drain terminal of the MOSFET Mos2H and the source terminal of the MOSFET Mos3L are connected to the terminal Tm-Cs2. The drain terminal of the MOSFET Mos3H and the source terminal of the MOSFET Mos4L are connected to the terminal Tm-Cs3, and the drain terminal of the MOSFET Mos4H is connected to the terminal Tm-Cs4.

One end of the LC serial body LC 12 is connected to a contact point of the MOSFET Mos1L and the MOSFET Mos1H, and the other end thereof is connected to a contact point of the MOSFET Mos2L and the MOSFET Mos2H. One end of the LC serial body LC 13 is connected to the contact point of the MOSFET Mos1L and the MOSFET Mos1H, and the other end thereof is connected to a contact point of the MOSFET Mos3L and the MOSFET Mos3H. One end of the LC serial body LC 14 is connected to the contact point of the MOSFET Mos1L and the MOSFET Mos1H, and the other end thereof is connected to a contact point of the MOSFET Mos4L and the MOSFET Mos4H.

The gate terminals of the MOSFETs Mos1L and Mos1H are connected to output terminals of the gate driving circuit 111, and input terminals of the gate driving circuit 111 are applied with respective gate driving signals which have the voltage of the source terminal of the MOSFET Mos1L as a reference. Likewise, the gate terminals of the MOSFETs Mos2L and Mos2H to Mos4L and Mos4H are connected to output terminals of the gate driving circuit 112 to 114, and input terminals of the gate driving circuit 112 to 114 are applied with respective gate driving signals which have the voltage of the source terminal of the MOSFET Mos2L to Mos4L as a reference. The gate driving circuits 111 to 114 are typical bootstrap typed driving circuits, which are comprised of driving ICs for driving half-bridge inverter circuits or capacitors for driving high voltage sided MOSFETs, and so on.

The gate driving signal for driving the MOSFET Mos1L is output from the photocoupler 121L and the gate driving signal for driving the MOSFET Mos1H is output from the photocoupler 121H. Likewise, the gate driving signals for driving the MOSFETs Mos2L to Mos4L are output from the photocouplers 122L to 124L and the gate driving signals for driving the MOSFETs Mos2H to Mos4H are output from the photocoupler 122H to 124H, respectively. The photocouplers 121L to 124L and 121H to 124H are applied with the gate signals GateL-X, GateL-Y and GateL-Z, and GateH-X, GateH-Y and GateH-Z output to the respective column circuits X, Y and Z from the control circuit 130.

The operations of the respective column circuits X, Y and Z will now be described.

The circuit A1 operates as an inverter circuit for driving to transfer energy input across the voltage terminals VL and Vcom to the high voltage side by on and off operations of the MOSFETs Mos1L and Mos1H. The circuits A2, A3 and A4 operate as rectifier circuits to rectify currents driven by the inverter circuit for driving A1 and to transfer energy to the high voltage side. The control circuit 130 outputs the gate signals GateL-X, GateL-Y and GateL-Z, and GateH-X, GateH-Y and GateH-Z to the respective column circuits X, Y and Z for operation thereof.

The capacitances of the smoothing capacitors Cs1, Cs2, Cs3 and Cs4 are set to be sufficiently larger than those of the capacitors Cr12, Cr13 and Cr14 of the LC serial bodies. As described above, the voltage V1 input across the voltage terminals VL and Vcom is converted into the voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs1 is charged with the voltage V1 and the smoothing capacitors Cs2, Cs3 and Cs4 are charged with an average voltage of (V2−V1)/3.

Figure 2:
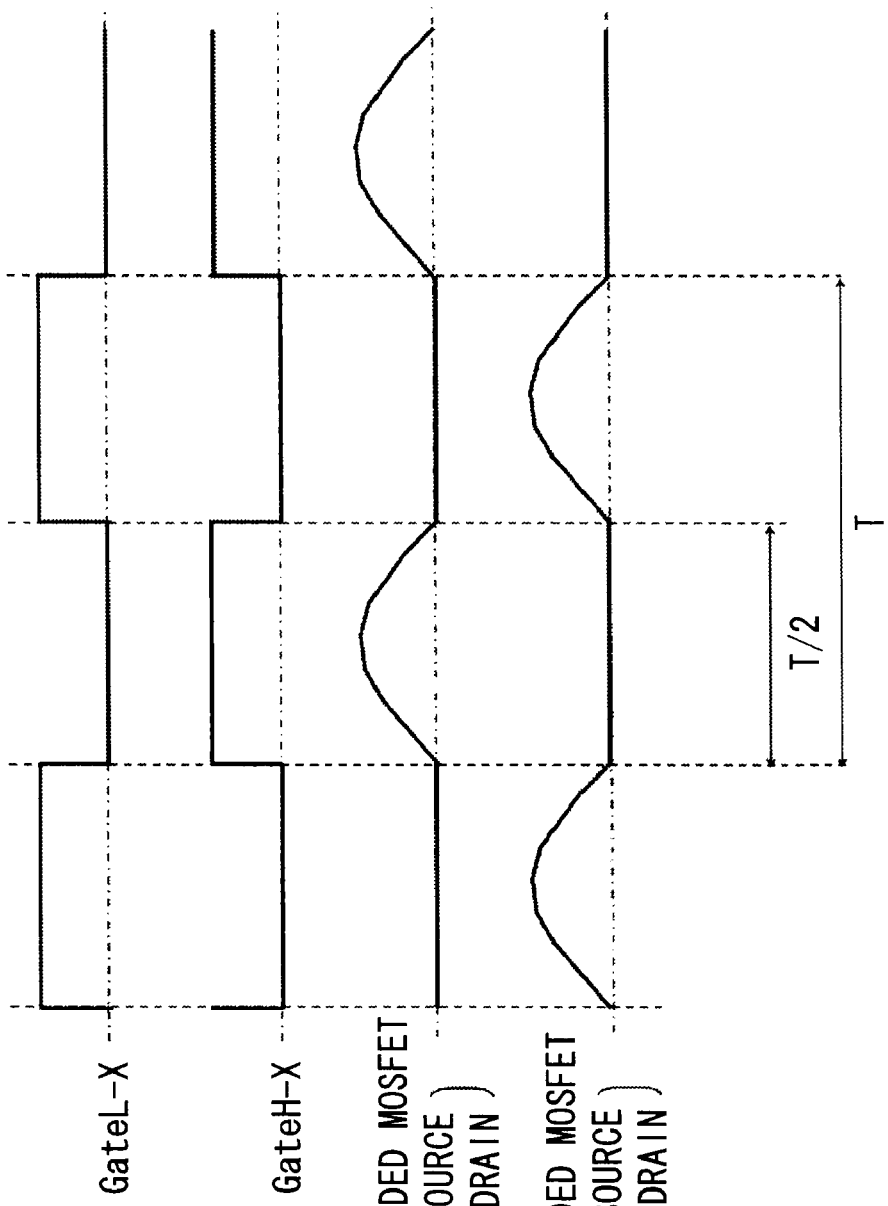
FIG. 2 shows waveforms of gate signals and current waveforms of respective elements according to the first embodiment.

The waveforms of the gate signals GateL-X and GateH-X input to the column circuit X, and the waveforms of currents flowing through the high voltage sided MOSFETs Mos1H and Mos2H to Mos4H and the low voltage sided MOSFETs Mos1L and Mos2L to Mos4L in the inverter circuit for driving A1 and the rectifier circuits A2, A3 and A4 are shown in FIG. 2. Currents flow from the drains to the sources in the MOSFETs of the inverter circuit for driving A1 and currents flow from the source to the drains in the MOSFETs of the rectifier circuits A2, A3 and A4. The MOSFETs turn on at high levels of the gate signals.

As shown in FIG. 2, the gate signals GateL-X, GateH-X are on and off signals having a resonant cycle T determined by the LC serial bodies LC12, LC13 and LC 14 including Lr and Cr, and a duty ratio of about 50%. The waveforms of the gate signals GateL-Y, GateH-Y, GateL-Z and GateH-Z input to the column circuits Y and Z and currents flowing through the respective MOSFETs in the column circuits Y and Z are the same as those in shown FIG. 2.

When the low voltage sided MOSFETs Mos1L, Mos2L, Mos3L and Mos4L of the respective circuits A1 to A4 turn on by the gate signals GateL (GateL-X, GateL-Y and GateL-Z), some energy accumulated in the smoothing capacitors Cs1, Cs2 and Cs3 is transferred to the capacitors Cr12, Cr13 and Cr14 via paths as described below, due to voltage differences therebetween.

Cs1 ⇒ Mos2L ⇒ Lr12 ⇒ Cr12 ⇒ Mos1L

Cs1 ⇒ Cs2 ⇒ Mos3L ⇒ Lr13 ⇒ Cr13 ⇒ Mos1L

Cs1 ⇒ Cs2 ⇒ Cs3 ⇒ Mos4L ⇒ Lr14 ⇒ Cr14 ⇒ Mos1L

Subsequently, when the high voltage sided MOSFETs Mos1H, Mos2H, Mos3H and Mos4H of the respective circuits A1 to A4 turn on by the gate signals GateH (GateH-X, GateH-Y and GateH-Z), energy accumulated in the capacitors Cr12, Cr13 and Cr14 is transferred to the smoothing capacitors Cs2, Cs3 and Cs4 via paths as described below, due to voltage differences therebetween.

Cr12 ⇒ Lr12 ⇒ Mos2H ⇒ Cs2 ⇒ Mos1H

Cr13 ⇒ Lr13 ⇒ Mos3H ⇒ Cs3 ⇒ Cs2 ⇒ Mos1H

Cr14 ⇒ Lr14 ⇒ Mos4H ⇒ Cs4 ⇒ Cs3 ⇒ Cs2 ⇒ Mos1H

As shown above, energy is transferred from the smoothing capacitor Cs1 to the smoothing capacitors Cs2, Cs3 and Cs4 by the charge-discharge of the capacitors Cr12, Cr13 and Cr14. Furthermore, the voltage V1 input across the voltage terminals VL and Vcom is converted into the boosted voltage V2 about four times higher than that for output across the terminals VH and Vcom. Since the respective capacitors Cr12, Cr13 and Cr14 are connected in series to the respective inductors Lr12, Lr13 and Lr14 to comprise the LC serial bodies LC12, LC13 and LC14, the transfer of the energy uses a resonant phenomenon, and thus a large amount of energy can be transferred efficiently.

Moreover, since the rectifier circuits A2 to A4 adopt the MOSFETs in the present embodiment, conduction loss can be reduced and also efficiency of power conversion can be increased relative to a case of adopting diodes.

In the present embodiment, the LC serial bodies LC12, LC13 and LC14 are connected between the inverter circuit for driving A1 and the remaining respective circuits A2, A3 and A4 as a rectifier circuit, and both terminals of the smoothing capacitor Cs1 are connected to the low voltage sided terminals VL and Vcom which are input terminals.

Current values flowing through the LC serial bodies LC12, LC13 and LC14 are referred to as "I12, I13 and I14," respectively, and voltage values across the capacitors Cr12, Cr13 and Cr14 are referred to as "V12, V13 and V14," respectively. Moreover, as a comparative example, the LC serial bodies LC12, LC23 and LC34 are connected between the middle terminals (the contact points of the low voltage sided MOSFETs and the high voltage sided MOSFETs) of the adjacent circuits such as A1 and A2, A2 and A3, A3 and A4 to be operated likewise. When current values flowing through the LC serial bodies LC12, LC23 and LC34 are referred to as "I12r, I23r and I34r," respectively, and voltage values across the capacitors Cr12, Cr23 and Cr34 in the LC serial bodies LC12, LC23 and LC34 are referred to as "V12r, V23r and V34r," respectively, in this comparative example, the comparative example gives:

I12r:I23r:I34r=3:2:1

V12r=V23r=V34r

On the contrary, the first embodiment gives:

I12=I13=I14 (=I34r)

V12:V13:V14=1:2:3 (V12=V12r=V23r=V34r)

As shown above, since the LC serial bodies LC12, LC13 and LC14 are connected between the middle terminals of the circuit A1 and the remaining respective circuits A2, A3 and A4 in the first embodiment, the voltage values of capacitors Cr12, Cr13 and Cr14 increase relative to those of the comparative example, but the value of current flowing through the LC serial body LC12 can be reduced to ⅓ and the value of current flowing through the LC serial body LC 13 whose high voltage side is connected to the circuit A3 can be reduced to ½ relative to that of current flowing through the LC serial body LC23 in the comparative example. In other words, the values of currents flowing through the respective LC serial bodies LC12, LC13 and LC14 are set to be the same value as the minimum one. This can reduce current rating of the inductors Lr and the capacitors Cr of the LC serial bodies LC12, LC13 and LC14 for transfer of energy and thus the inductors Lr and the capacitors Cr can be small-sized.

The respective column circuits X, Y and Z operate as described above, and an entire operation of the DC/DC power conversion device with all of three column circuits X, Y and Z will be described.

Figure 3:
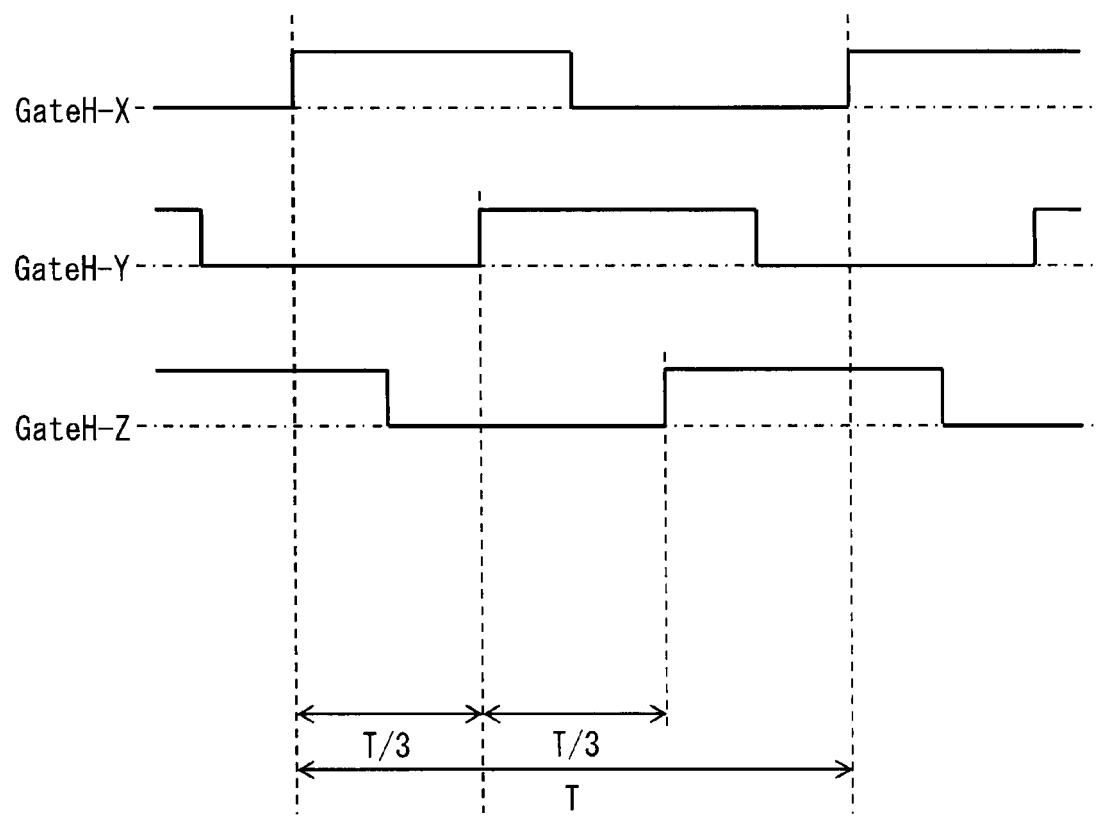
FIG. 3 shows waveforms of gate signals for driving respective column circuits according to the first embodiment.

FIG. 3 represents the waveforms of the gate signals GateH-X, GateH-Y and GateH-Z for driving the high voltage sided MOSFETs in the respective column circuits X, Y and Z. Inversion signals of such gate signals GateH-X, GateH-Y and GateH-Z are the gate signals GateL-X, GateL-Y and GateL-Z for driving the low voltage sided MOSFETs as shown in FIG. 2.

Referring to FIG. 3, the gate signals for driving the respective column circuits X, Y and Z have the same cycle T and also are out of phase with each other by T/3.

Figure 4:
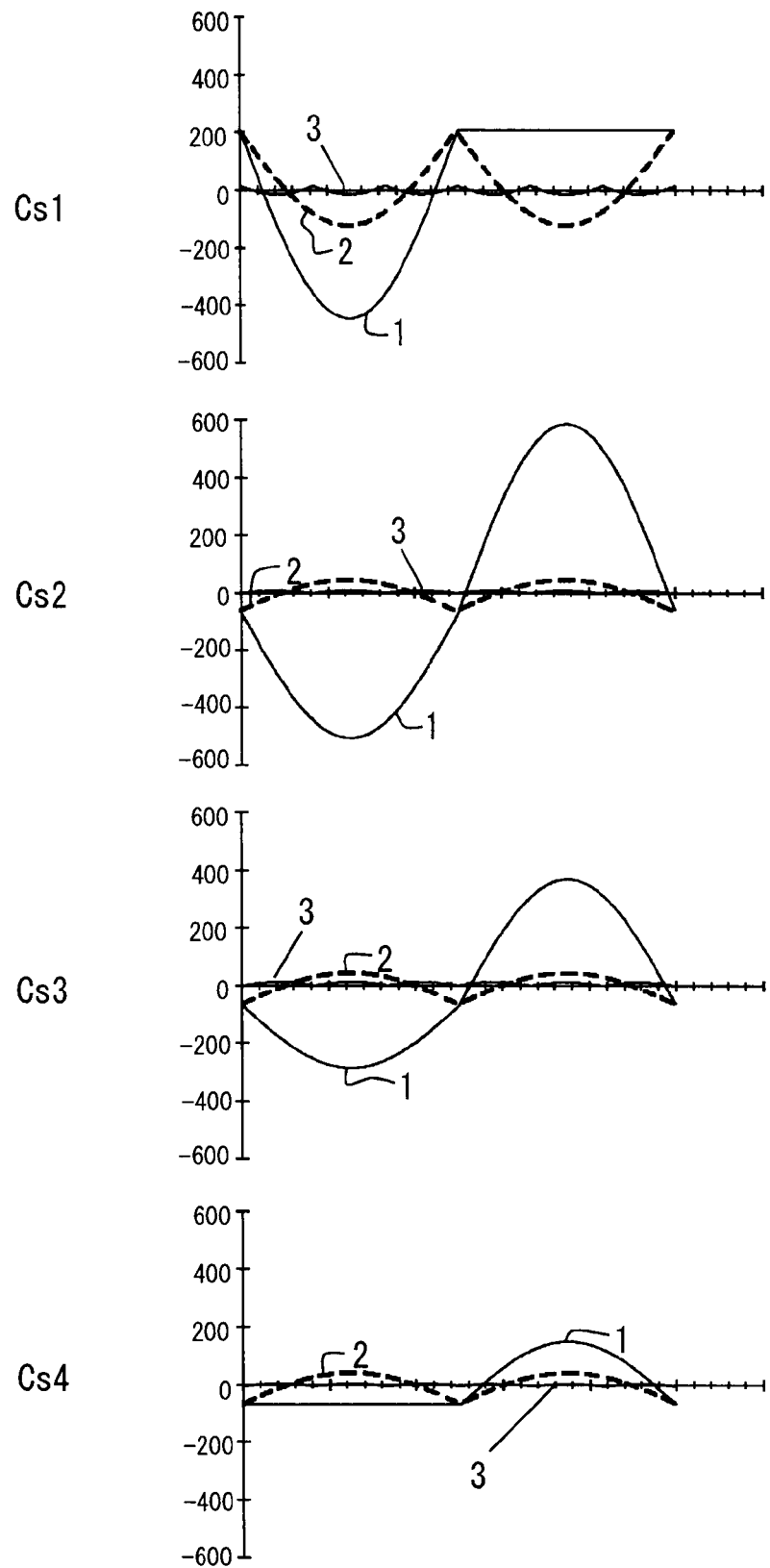
FIG. 4 shows currents flowing through smoothing capacitors according to the first embodiment together with comparative examples.

For example, FIG. 4 shows waveforms of currents flowing through the smoothing capacitors Cs1, Cs2, Cs3 and Cs4 under the condition of the voltage V1 of 36V and an input direct current of 280 A. FIG. 4 shows the waveforms of currents flowing through the smoothing capacitors for a case driven with three column circuits out of phase with each other by T/3 (represented by numeral 3), that is, according to the first embodiment, and the waveforms of currents flowing through the smoothing capacitors for a case driven with one column circuit (represented by numeral 1) and a case driven with two column circuits out of phase with each other by T/2 (represented by numeral 2) as comparative examples. The longitudinal axis represents currents and the transverse axis represents time.

As shown in FIG. 4, the case driven with three column circuits out of phase with each other by T/3 reduces ripple currents flowing through the smoothing capacitors Cs1, Cs2, Cs3 and Cs4 more than the case driven with one or two column circuits. The more the number of the column circuits is, the less the ripple currents flow through the smoothing capacitors Cs1, Cs2, Cs3 and Cs4.

As shown above, in the first embodiment, the column circuits X, Y and Z each comprised of the four-stage circuits A1, A2, A3 and A4 share the smoothing capacitors Cs1, Cs2, Cs3 and Cs4 to be connected in parallel, and have the same driving cycle and are out of phase with each other by 2π/3(rad) for driving the DC/DC power conversion device. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced.

Assuming that three column circuits X, Y and Z do not share the smoothing capacitors Cs1, Cs2, Cs3 and Cs4 and instead each of the column circuits X, Y and Z has their own smoothing capacitors Cs1, Cs2, Cs3 and Cs4, even if the column circuits X, Y and Z are driven under the same condition as the first embodiment, the smoothing capacitors Cs1, Cs2, Cs3 and Cs4 in the respective column circuits X, Y and Z do not share currents and thus the ripple currents cannot be reduced.

Such reduction of the ripple currents flowing through the smoothing capacitors has following effects.

A heat-emission of the smoothing capacitors is restricted and reliability of the DC/DC power conversion device is increased. Moreover, a loss due to resistance is reduced by the current reduction and efficiency for power conversion is increased. Capacitances required for the smoothing capacitors are reduced and the size thereof is made smaller, and thereby a structure of the device can be promoted to be made small-sized.

Moreover, a ceramic capacitor with a large loss for induced electricity but small size can be adopted as the smoothing capacitor and thus the size of the smoothing capacitor can be made much smaller.

Although the first embodiment adopts three column circuits, an effect of reducing the ripple currents flowing through the smoothing capacitors Cs1, Cs2, Cs3 and Cs4 is acquired by arranging a plurality (n) of column circuits and being out of phase with each other by 2π/n(rad) for operation of the column circuits. The more the number n of the column circuits is, the more the ripple currents flowing through the smoothing capacitors Cs1, Cs2, Cs3 and Cs4 are reduced.

The driving such as being out of phase with each other by 2π/n(rad) among the column circuits is the best, but, not limited thereto, if only there exists a phase difference among the column circuits, the charge-discharge currents flowing to the smoothing capacitors Cs1, Cs2, Cs3 and Cs4 can be circulated among the column circuits, and thus an effect of reducing the ripple currents is acquired.

Second Embodiment

Though the first embodiment represents a voltage boost typed DC/DC power conversion device which boosts the voltage V1 into about four times higher voltage V2, the second embodiment represents a voltage deboost typed DC/DC power conversion device which deboosts the voltage V2 into V1.

The circuital structure of the DC/DC power conversion device according to the second embodiment is the same as that shown in FIG. 1; in this case, however, circuits A2, A3 and A4 in the column circuits X, Y and Z operate as an inverter circuit for driving and a circuit A1 operates as a rectifier circuit to rectify currents driven by the inverter circuits for driving and to transfer energy to a low voltage side. The control circuit 130 outputs the gate signals (GateL-X, GateH-X), (GateL-Y, GateH-Y) and (GateL-Z, GateH-Z) to the respective column circuits X, Y and Z for operation thereof.

The operation of the column circuits X, Y and Z will now be described.

The capacitances of the smoothing capacitors Cs1, Cs2, Cs3 and Cs4 are set to be sufficiently larger than those of the capacitors Cr12, Cr13 and Cr14 of the LC serial bodies. Since the respective column circuits X, Y and Z are DC/DC converters having a function that the voltage V2 input across the voltage terminals VH and Vcom is converted into the voltage V1 a fourth time lower than that for output across the voltage terminals VL and Vcom, a load is connected between the voltage terminal VL and Vcom, and thus the voltage V2 has a higher value than 4×V1. In the steady state, the smoothing capacitor Cs1 is charged with the voltage V1 and the smoothing capacitors Cs2, Cs3 and Cs4 are charged with an average voltage of (V2−V1)/3.

Figure 5:
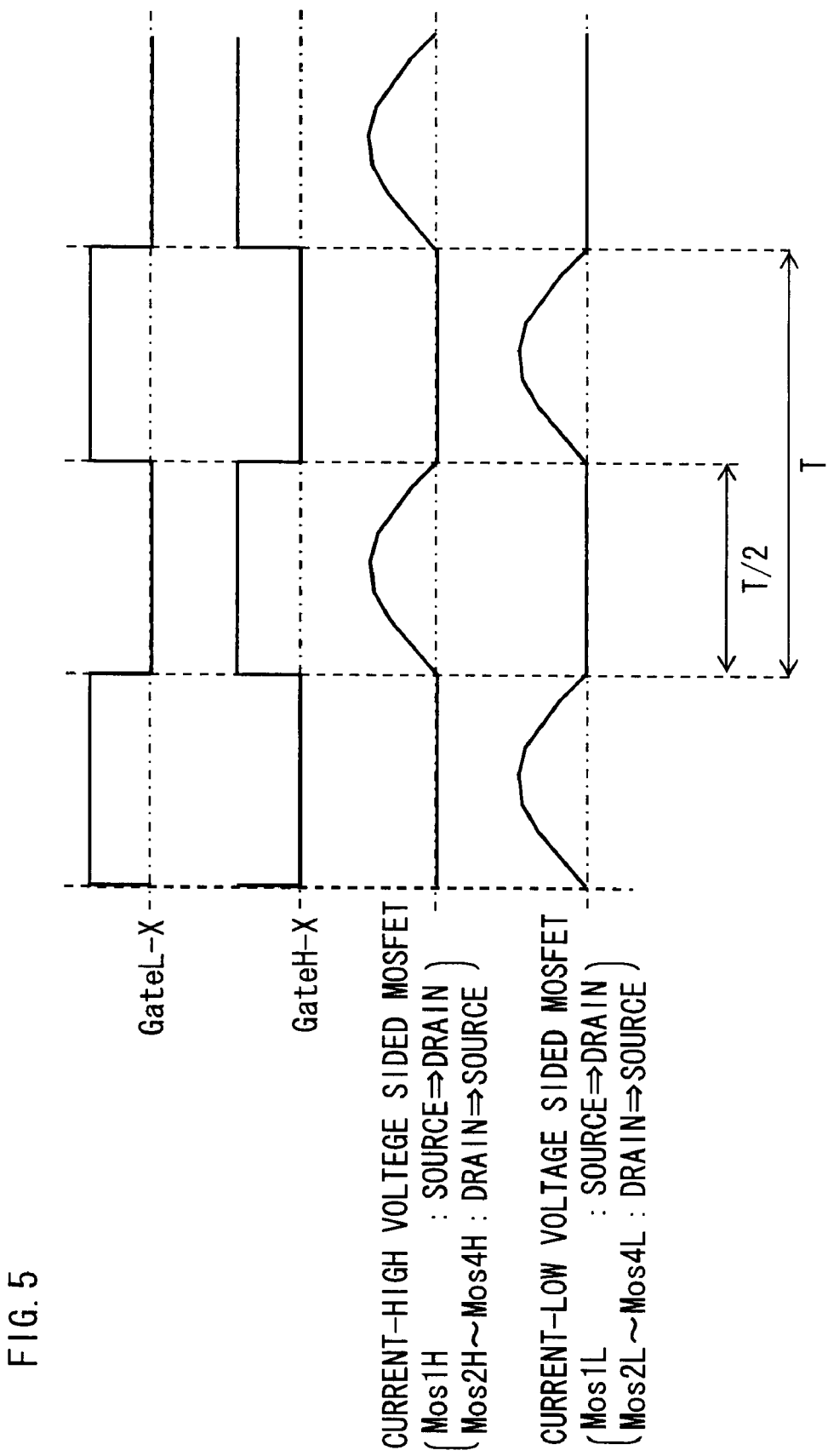
FIG. 5 shows waveforms of gate signals and current waveforms of respective units according to a second embodiment.

The waveforms of the gate signals GateL-X and GateH-X input to the column circuit X, and the waveforms of currents flowing through the high voltage sided MOSFETs Mos2H to Mos4H and Mos1H and the low voltage sided MOSFETs Mos2L to Mos4L and Mos1L in the inverter circuits for driving A2 to A4 and the rectifier circuit A1 are shown in FIG. 5. Currents flow from the drains to the sources in the MOSFETs of the inverter circuits for driving A2 to A4 and currents flow from the sources to the drains in the MOSFETs of the rectifier circuit A1. The MOSFETs turn on at high level of the gate signals.

As shown in FIG. 5, the gate signals GateL-X, GateH-X are on and off signals having a resonant cycle T determined by the LC serial bodies LC12, LC13 and LC 14 including Lr and Cr, and a duty ratio of about 50%. The waveforms of the gate signals GateL-Y, GateH-Y and GateL-Z, GateH-Z input to the column circuits Y and Z and currents flowing through the respective MOSFETs are the same as those in shown FIG. 5.

When the high voltage sided MOSFETs Mos2H, Mos3H, Mos4H and Mos1H of the respective circuits A2 to A4 and A1 turn on by the gate signals GateH (GateH-X, GateH-Y and GateH-Z), some energy accumulated in the smoothing capacitors Cs2, Cs3 and Cs4 is transferred to the capacitors Cr12, Cr13 and Cr14 via paths as described below, due to voltage differences therebetween.

Cs2⇒Cs3⇒Cs4⇒Mos4H⇒Lr14⇒Cr14⇒Mos1H

Cs2⇒Cs3⇒Mos3H⇒Lr13⇒Cr13⇒Mos1H

Cs2⇒Mos2H⇒Lr12⇒Cr12⇒Mos1H

Subsequently, when the low voltage sided MOSFETs Mos2L, Mos3L, Mos4L and Mos1L of the respective circuits A2 to A4 and A1 turn on by the gate signals GateL (GateL-X, GateL-Y and GateL-Z), some energy accumulated in the capacitors Cr12, Cr13 and Cr14 is transferred to the smoothing capacitors Cs1, Cs2 and Cs3 via paths as described below, due to voltage differences therebetween.

Cr14⇒Lr14⇒Mos4L⇒Cs3⇒Cs2⇒Cs1⇒Mos1L

Cr13⇒Lr13⇒Mos3L⇒Cs2⇒Cs1⇒Mos1L

Cr12⇒Lr12⇒Mos2L⇒Cs1⇒Mos1L

As shown above, energy is transferred from the smoothing capacitors Cs2, Cs3 and Cs4 to the smoothing capacitor Cs1 by the charge-discharge of the capacitors Cr12, Cr13 and Cr14. Furthermore, the voltage V2 input across the voltage terminals VH and Vcom is converted into the deboosted voltage V1 about a fourth time lower than that for output across the terminals VL and Vcom. Since the respective capacitors Cr12, Cr13 and Cr14 are connected in series to the respective inductors Lr12, Lr13 and Lr14 to comprise the LC serial bodies LC12, LC13 and LC14, the transfer of the energy uses a resonant phenomenon, and thus a large amount of energy can be transferred efficiently.

Moreover, since the rectifier circuit A1 adopts the MOSFETs in the present embodiment, conduction loss can be reduced and also efficiency of power conversion can be increased relative to a case of adopting diodes.

In the second embodiment, the LC serial bodies LC12, LC13 and LC14 are connected between the rectifier circuit A1 and the remaining respective circuits A2, A3 and A4 as an inverter circuit for driving, and both terminals of the smoothing capacitor Cs1 are connected to the low voltage sided terminals VL and Vcom which are input terminals. Compared with a case driven by connection of the LC serial bodies LC12, LC23 and LC34 between the adjacent circuits like the comparative example in the first embodiment, the value of current flowing through the LC serial body LC12 can be reduced to ⅓ and the value of current flowing through the LC serial body LC 13 whose high voltage side is connected to the circuit A3 can be reduced to ½ relative to that of current flowing through the LC serial body LC23 in the comparative example, in the second embodiment as well. In other words, the values of currents flowing through the respective LC serial bodies LC12, LC13 and LC14 are set to be the same value as the minimum one. This can reduce current rating of the inductor Lr and the capacitor Cr of the LC serial bodies LC12, LC13 and LC14 for transfer of energy and thus the inductor Lr and the capacitor Cr can be small-sized.

The respective column circuits X, Y and Z operate as described above. And the gate signals for driving the respective column circuits X, Y and Z have the same cycle T (where T is a resonant cycle determined by the LC serial body) and the gate signals also are out of phase with each other by T/3(2π/3(rad)) like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the second embodiment as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by 2π/n(rad) among the column circuits is the most effective. And the more the number n of the column circuits is, the less the ripple currents flow through the smoothing capacitors Cs1, Cs2, Cs3 and Cs4.

Furthermore, although the first embodiment represents the voltage boost typed DC/DC power conversion device of V1 ⇒V2 and the second embodiment represents the voltage deboost typed DC/DC power conversion device of V2⇒V1, energy transfer in both directions can be realized by including both of two functions of the first and second embodiments for carrying out the invention. In this case, if V1×4>V2, an operation of boosting voltage is performed, and, on boosting voltage, the circuit A1 is used as an inverter circuit for driving and the circuits A2, A3 and A4 are used as rectifier circuits. Further, if V1×4<V2, an operation of deboosting voltage is performed, and, on deboosting voltage, the circuits A2, A3 and A4 are used as inverter circuits for driving and the circuit A1 is used as a rectifier circuit.

The boosting-deboosting DC/DC power conversion device controlled as described above obtains the same effects as the first and second embodiments for carrying out the invention and also can be used widely due to realization of energy transfer in both directions.

Third Embodiment

A DC/DC power conversion device according to the third embodiment for carrying out the invention will be described.

Figure 6:
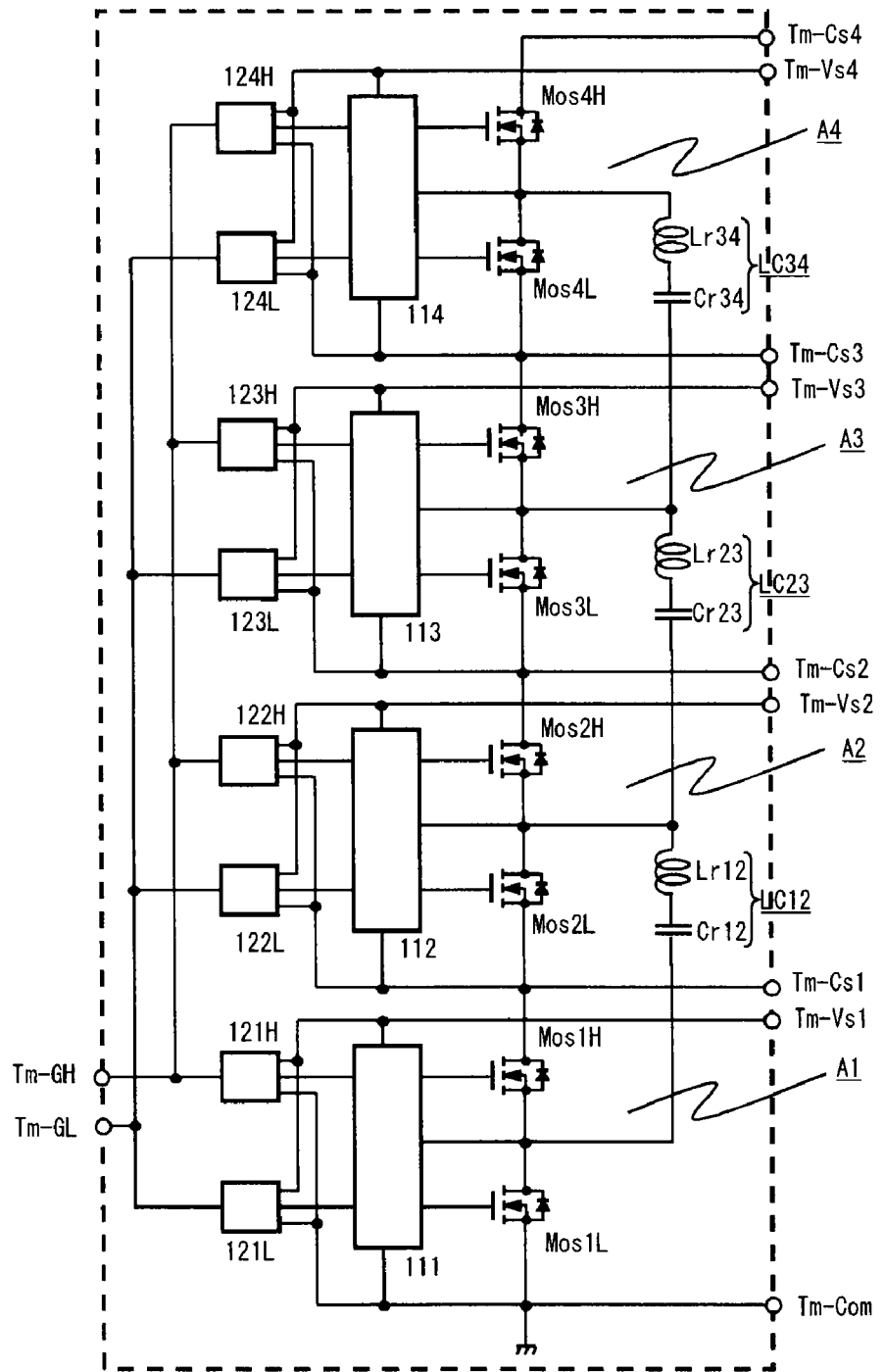
FIG. 6 is a block diagram to represent a circuital structure of a DC/DC power conversion device according to a third embodiment.

A circuital structure of the DC/DC power conversion device according to the third embodiment for carrying out the invention is different from that shown in FIG. 1 in structures of respective column circuits X, Y and Z, and the structures of the column circuits X, Y and Z are shown in FIG. 6. Remaining structures are the same as those shown in FIG. 1.

Each of the column circuits X, Y and Z is a DC/DC converter having a function to convert the voltage V1 input between the voltage terminals VL and Vcom into about four times higher boosted voltage V2 for output between the voltage terminals VH and Vcom, like the first embodiment.

As shown in FIG. 6, the column circuit X (Y and Z) is constructed by connecting in series two MOSFETs Mos1L and Mos1H, Mos2L and Mos2H, Mos3L and Mos3H, and Mos4L and Mos4H as a low voltage sided element and a high voltage sided element, and by connecting in series the four-stage circuits A1, A2, A3 and A4 connected between both terminals of the respective smoothing capacitors Cs1, Cs2, Cs3 and Cs4 (refer to FIG. 1). Respective LC serial bodies LC12, LC23 and LC34 are comprised of capacitors Cr12, Cr23 and Cr34 and inductors Lr12, Lr23 and Lr34 connected in series and play a part in transferring energy. The LC serial bodies LC12, LC23 and LC34 are connected between two middle terminals such as middle terminals corresponding to contact points of two MOSFETs in each circuit A1, A2, A3 and A4. And the two middle terminals are in the respective adjacent circuits, that is, A1 and A2, A2 and A3, and A3 and A4. A resonant cycle determined by an inductance of the inductor Lr and a capacitance of the capacitor Cr in each stage is set to be the same in every stage.

Each MOSFET is a power MOSFET with a parasitic diode formed between a source and a drain thereof.

Moreover, the column circuit X (Y and Z) includes gate driving circuits 111 to 114 and photocouplers 121L and 121H to 124L and 124H for driving the MOSFETs in the respective circuits A1, A2, A3 and A4, and further includes gate signal input terminals Tm-GH and Tm-GL and power input terminals or terminals for connection of the smoothing capacitors Tm-Com, Tm-Vs1 to Tm-Vs4 and Tm-Cs1 to Tm-Cs4.

In the third embodiment for carrying out the invention, one end of the LC serial body LC 12 is connected to a contact point of the MOSFET Mos1L and the MOSFET Mos1H, and the other end thereof is connected to a contact point of the MOSFET Mos2L and the MOSFET Mos2H. One end of the LC serial body LC 23 is connected to the contact point of the MOSFET Mos2L and the MOSFET Mos2H, and the other end thereof is connected to a contact point of the MOSFET Mos3L and the MOSFET Mos3H. One end of the LC serial body LC 34 is connected to the contact point of the MOSFET Mos3L and the MOSFET Mos3H, and the other end thereof is connected to a contact point of the MOSFET Mos4L and the MOSFET Mos4H. The remaining connection relationships are the same as those in the first embodiment.

The operation of the respective column circuits X, Y and Z will be described.

Like the first embodiment, the circuit A1 operates as an inverter circuit for driving and the circuits A2, A3 and A4 operate as rectifier circuits to rectify currents driven by the inverter circuit for driving A1 and to transfer energy to the high voltage side. The control circuit 130 outputs the gate signals (GateL-X, GateH-X), (GateL-Y, GateH-Y) and (GateL-Z, GateH-Z) to the respective column circuits X, Y and Z for operation thereof. Such gate signals are the same as those in the first embodiment, and the relationships between currents flowing through the MOSFETs in the respective circuits A1 to A4 and the gate signals are the same as those shown in FIG. 2 of the first embodiment as well.

The capacitances of the smoothing capacitors Cs1, Cs2, Cs3 and Cs4 are set to be sufficiently larger than those of the capacitors Cr12, Cr13 and Cr14 of the LC serial bodies. A load is connected between the voltage terminal VH and Vcom, and thus the voltage V2 has a lower value than 4×V1. In the steady state, the smoothing capacitor Cs1 is charged with the voltage V1 and the smoothing capacitors Cs2, Cs3 and Cs4 are charged with an average voltage of (V2−V1)/3.

When the low voltage sided MOSFETs Mos1L, Mos2L, Mos3L and Mos4L of the respective circuits A1 to A4 turn on by the gate signals GateL (GateL-X, GateL-Y and GateL-Z), some energy accumulated in the smoothing capacitors Cs1, Cs2 and Cs3 is transferred to the capacitors Cr12, Cr23 and Cr34 via paths as described below, due to voltage differences therebetween.

Cs1 ⇒Mos2L⇒Lr12⇒Cr12⇒Mos1L

Cs1 ⇒Cs2⇒Mos3L⇒Lr23⇒Cr23⇒Lr12⇒Cr12⇒Mos1L

Cs1 ⇒Cs2⇒Cs3⇒Mos4L⇒Lr34⇒Cr34⇒Lr23⇒Cr23 ⇒Lr12⇒Cr12⇒Mos1L

Subsequently, when the high voltage sided MOSFETs Mos1H, Mos2H, Mos3H and Mos4H of the respective circuits A1 to A4 turn on by the gate signals GateH (GateH-X, GateH-Y and GateH-Z), energy accumulated in the capacitors Cr12, Cr23 and Cr34 is transferred to the smoothing capacitors Cs2, Cs3 and Cs4 via paths as described below, due to voltage differences therebetween.

Mos1H⇒Cr12⇒Lr12⇒Mos2H⇒Cs2

Mos1H⇒Cr12⇒Lr12⇒Cr23⇒Lr23⇒Mos3H⇒Cs3⇒Cs2

Mos1H⇒Cr12⇒Lr12⇒Cr23⇒Lr23⇒Cr34⇒Lr34 ⇒Mos4H⇒Cs4⇒Cs3⇒Cs2

As shown above, energy is transferred from the smoothing capacitor Cs1 to the smoothing capacitors Cs2, Cs3 and Cs4 by the charge-discharge of the capacitors Cr12, Cr23 and Cr34. Furthermore, the voltage V1 input across the voltage terminals VL and Vcom is converted into about four times higher boosted voltage V2 for output across the terminals VH and Vcom. Since the respective capacitors Cr12, Cr23 and Cr34 are connected in series to the respective inductors Lr12, Lr23 and Lr34 to comprise the LC serial bodies LC12, LC23 and LC34, the transfer of the energy uses a resonant phenomenon, and thus a large amount of energy can be transferred efficiently.

Moreover, since the rectifier circuits A2 to A4 adopt the MOSFETs in the present embodiment, conduction loss can be reduced and also efficiency of power conversion can be increased relative to a case of adopting diodes.

In the present embodiment, the LC serial bodies LC12, LC23 and LC34 are connected between the adjacent circuits.

Compared with the case described in the first embodiment, that is, the case driven by connection of the LC serial bodies LC12, LC13 and LC14 between the circuit A1 and the remaining respective A2, A3 and A4, currents flowing through the LC serial bodies are increased, but the applied voltage across the capacitor Cr34 can be reduced to ⅓ relative to that across the capacitor Cr14 and the applied voltage across the capacitor Cr23 can be reduced to ½ relative to that across the capacitor Cr13.

The respective column circuits X, Y and Z operate as described above. And the gate signals for driving the respective column circuits X, Y and Z have the same cycle T (where T is a resonant cycle determined by the LC serial body) and the gate signals also are out of phase with each other by T/3(2π/3(rad)) like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

Fourth Embodiment

Though the third embodiment represents a voltage boost typed DC/DC power conversion device which boosts the voltage V1 into about four times higher voltage V2, the present embodiment represents a voltage deboost typed DC/DC power conversion device which deboosts the voltage V2 into the voltage V1.

The circuital structure of the DC/DC power conversion device according to the present embodiment is the same as that in the third embodiment for carrying out the invention; in this case, however, circuit A4 in the respective column circuits X, Y and Z operates as an inverter circuit for driving, a circuit A1 operates as a rectifier circuit to rectify currents driven by the inverter circuit and to transfer energy to a low voltage side, and each of circuits A2 and A3 functions as both an inverter circuit for driving and a rectifier circuit.

The control circuit 130 outputs the gate signals (GateL-X, GateH-X), (GateL-Y, GateH-Y) and (GateL-Z, GateH-Z) to the respective column circuits X, Y and Z for operation thereof. These gate signals are the same as those in the second embodiment, and the relationships between currents flowing through the MOSFETs in the respective circuits A1 to A4 and the gate signals are the same as those shown in FIG. 5 of the second embodiment.

The operation of the column circuits X, Y and Z will now be described.

The capacitances of the smoothing capacitors Cs1, Cs2, Cs3 and Cs4 are set to be sufficiently larger than those of the capacitors Cr12, Cr13 and Cr14 of the LC serial bodies. Since the respective column circuits X, Y and Z are DC/DC converter having a function that the voltage V2 input across the voltage terminals VH and Vcom is converted into a fourth time lower deboosted voltage V1, a load is connected between the voltage terminal VL and Vcom, and thus the voltage V2 has a higher value than 4×V1. In the steady state, the smoothing capacitor Cs1 is charged with the voltage V1 and the smoothing capacitors Cs2, Cs3 and Cs4 are charged with an average voltage of (V2−V1)/3.

When the high voltage sided MOSFETs Mos2H, Mos3H, Mos4H and Mos1H of the respective circuits A2, A3, A4 and A1 turn on by the gate signals GateH (GateH-X, GateH-Y and GateH-Z), some energy accumulated in the smoothing capacitors Cs2, Cs3 and Cs4 is transferred to the capacitors Cr12, Cr23 and Cr34 via paths as described below, due to voltage differences therebetween.

Cs2⇒Cs3⇒Cs4⇒Mos4H⇒Lr34⇒Cr34⇒Lr23⇒Cr23
⇒Lr12⇒Cr12⇒Mos1H

Cs2⇒Cs3⇒Mos3H⇒Lr23⇒Cr23⇒Lr12⇒Cr12⇒Mos1H

Cs2⇒Mos2H⇒Lr12⇒Cr12⇒Mos1H

Subsequently, when the low voltage sided MOSFETs Mos2L, Mos3L, Mos4L and Mos1L of the respective circuits A2 to A4 and A1 turn on by the gate signals GateL (GateL-X, GateL-Y and GateL-Z), some energy accumulated in the capacitors Cr12, Cr23 and Cr34 is transferred to the smoothing capacitors Cs1, Cs2 and Cs3 via paths as described below, due to voltage differences therebetween.

Cr12⇒Lr12⇒Cr23⇒Lr23⇒Cr34⇒Lr34⇒Mos4L⇒Cs3
⇒
Cs2⇒Cs1⇒Mos1L

Cr12⇒Lr12⇒Cr23⇒Lr23⇒Mos3L⇒Cs2⇒Cs1⇒Mos1L

Cr12⇒Lr12⇒Mos2L⇒Cs1⇒Mos1L

As shown above, energy is transferred from the smoothing capacitors Cs2, Cs3 and Cs4 to the smoothing capacitor Cs1 by the charge-discharge of the capacitors Cr12, Cr23 and Cr34. Furthermore, the voltage V2 input across the voltage terminals VH and Vcom is converted into a fourth time lower deboosted voltage V1 for output across the terminals VL and Vcom. Since the respective capacitors Cr12, Cr23 and Cr34 are connected in series to the respective inductors Lr12, Lr23 and Lr34 to comprise the LC serial bodies LC12, LC23 and LC34, the transfer of the energy uses a resonant phenomenon, and thus a large amount of energy can be transferred efficiently.

Moreover, since the rectifier circuits A1 to A3 adopts the MOSFETs in the present embodiment, conduction loss can be reduced and also efficiency of power conversion can be increased relative to a conventional case of adopting diodes.

The respective column circuits X, Y and Z operate as described above. And the gate signals for driving the respective column circuits X, Y and Z have the same cycle T (where T is a resonant cycle determined by the LC serial body) and the gate signals also are out of phase with each other by T/3(2π/3(rad)) like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the third and forth embodiments as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by 2π/n(rad) among the column circuits is the most effective. And the more the number n of the column circuits is, the less the ripple currents flow through the smoothing capacitors Cs1, Cs2, Cs3 and Cs4.

Furthermore, although the third embodiment for carrying out the invention represents the voltage boost typed DC/DC power conversion device of V1⇒V2 and the fourth embodiment represents the voltage deboost typed DC/DC power conversion device of V2⇒V1, energy transfer in both directions can be realized by including both of two functions of the third and forth embodiments for carrying out the invention. In this case, if V1×4>V2, an operation of boosting voltage is performed like the third embodiment for carrying out the invention, and, if V1×4<V2, an operation of deboosting voltage is performed like the fourth embodiment.

The boosting-deboosting DC/DC power conversion device controlled as described above obtains the same effects as the third and forth embodiments for carrying out the invention and also can be used widely due to realization of energy transfer in both directions.

Fifth Embodiment

A DC/DC power conversion device according to the fifth embodiment will be described.

Figure 7:
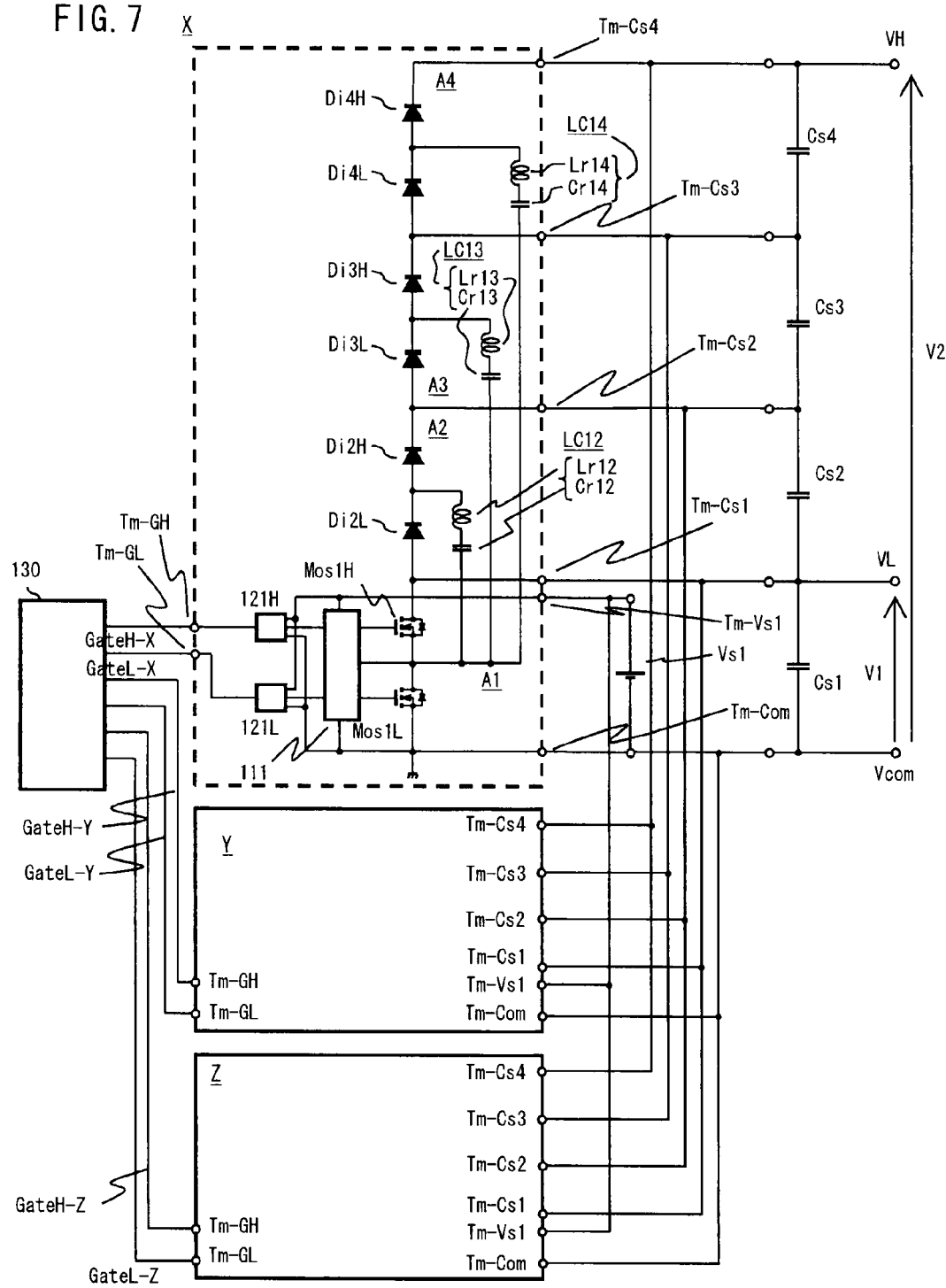
FIG. 7 is a block diagram to represent a circuital structure of a DC/DC power conversion device according to a fifth embodiment.

FIG. 7 is a block diagram to represent a circuital structure of a DC/DC power conversion device according to the fifth embodiment.

As shown in FIG. 7, the DC/DC power conversion device includes three column circuits X, Y and Z each comprised of circuits A1 to A4 of a plurality of stages (in this case, four stages), voltage source Vs1 for driving, smoothing capacitors Cs1, Cs2, Cs3 and Cs4 for smoothing input and output voltages and further for functioning as voltage sources for energy transfer, a control circuit 130, and input and output voltage terminals Vcom, VL and VH. The DC/DC power conversion device has a function to convert a voltage V1 input across the voltage terminals VL and Vcom into a boosted voltage V2 about four times higher than the voltage V1 for output across the voltage terminals VH and Vcom.

Each of the column circuits X, Y and Z is a DC/DC converter having a function to convert the voltage V1 input across the voltage terminals VL and Vcom into the boosted voltage V2 about four times higher than the voltage V1 for output across the voltage terminals VH and Vcom, the description of which will be made below. For convenience of explanation, although a circuital structure for the column circuit X is only shown, those for the column circuits Y and Z are the same, too.

As shown in FIG. 7, the circuit A1 among the four-stage circuits is an inverter circuit for driving constructed by, in the same manner as the first embodiment, connecting in series two MOSFETs Mos1L and Mos1H as a low voltage sided element and as a high voltage sided element and by connecting in series them between both ends of the smoothing capacitor Cs1. The circuit A2 to A4 are rectifier circuits constructed by connecting in series respective two diodes Di2L and Di2H, Di3L and Di3H, and Di4L and Di4H as a low voltage sided element and as a high voltage sided element and by connecting the respective two diodes between respective both ends of the smoothing capacitor Cs2, Cs3 and Cs4.

Respective LC serial bodies LC12, LC13 and LC14 are comprised of capacitors Cr12, Cr13 and Cr14 and inductors Lr12, Lr13 and Lr 14 connected in series and play a part in transferring energy. The four-stage circuits A1, A2, A3 and A4 are connected in series and the LC serial bodies LC12, LC13 and LC14 are connected between two middle terminals such as middle terminals corresponding to contact points of two elements (MOSFETs or diodes) in each circuit A1, A2, A3 and A4. The LC serial bodies are connected between the two middle terminals of the circuit A1 comprising a predetermined one circuit and the remaining respective circuits A2, A3 and A4. A resonant cycle determined by an inductance of the inductor Lr and a capacitance of the capacitor Cr in each stage is set to be the same in every stage.

Each MOSFET is a power MOSFET with a parasitic diode formed between a source and a drain thereof.

Moreover, the column circuit X (Y and Z) includes gate driving circuit 111 and photocouplers 121L and 121H for driving the MOSFETs in the circuit A1, and further includes gate signal input terminals Tm-GL and Tm-GH and power input terminals or terminals for connection of the smoothing capacitors Tm-Com, Tm-Vs1 and Tm-Cs1 to Tm-Cs4.

The voltage source Vs1 shared by the respective column circuits X, Y and Z is provided for driving the MOSFETs in the respective column circuits X, Y and Z, the gate driving circuit 111 and the photocoupler 121L and 121H, with respect to the source terminal of the MOSFET Mos1L.

The control circuit 130 outputs the gate signals (GateL-X, GateH-X), (GateL-Y, GateH-Y) and (GateL-Z, GateH-Z) to the respective column circuits X, Y and Z for operation of the respective column circuits X, Y and Z.

Subsequently, the operation thereof will be described.

The capacitances of the smoothing capacitors Cs1, Cs2, Cs3 and Cs4 are set to be sufficiently larger than those of the capacitors Cr of the LC serial bodies LC12, LC13 and LC14. The voltage V1 input across the voltage terminals VL and Vcom is converted into about four times higher voltage V2 for output across the voltage terminals VH and Vcom and a load is connected between the voltage terminal VH and Vcom, and thus the voltage V2 has a lower value than 4×V1. In the steady state, the smoothing capacitor Cs1 is charged with the voltage V1 and the smoothing capacitors Cs2, Cs3 and Cs4 are charged with an average voltage of (V2−V1)/3.

The inverter circuit for driving A1 transfers energy input across the voltage terminals VL and Vcom to the high voltage side depending on turn-on and turn-off operations of the MOSFETs Mos1L and Mos1H, and the rectifier circuits A2, A3 and A4 rectify currents driven by the inverter circuit for driving A1 and transfer energy to the high voltage side.

The gate signals GateL (GateL-X, GateL-Y, GateL-Z) and GateH (GateH-X, GateH-Y, GateH-Z) for two MOSFETs Mos1L and Mos1H are generated in the same manner as the first embodiment. Though currents flow from the sources to the drains of MOSFETs in the rectifier circuits A2 to A4 in the first embodiment, currents flow through the respective diodes in the rectifier circuits A2 to A4 in a forward direction in the present embodiment.

When the low voltage sided MOSFET Mos1L of the circuit A1 turns on by the gate signal GateL for the low voltage sided MOSFET, some energy accumulated in the smoothing capacitors Cs1, Cs2 and Cs3 is transferred to the capacitors Cr12, Cr13 and Cr14 via paths as described below, due to voltage differences therebetween.

Cs1 ⇒Di2L⇒Lr12⇒Cr12⇒Mos1L

Cs1 ⇒Cs2⇒Di3L⇒Lr13⇒Cr13⇒Mos1L

Cs1⇒Cs2⇒Cs3⇒Di4L⇒Lr14⇒Cr14⇒Mos1L

Subsequently, when the high voltage sided MOSFET Mos1H of the circuit A1 turns on by the gate signal GateH, energy accumulated in the capacitors Cr12, Cr13 and Cr14 is transferred to the smoothing capacitors Cs2, Cs3 and Cs4 via paths as described below, due to voltage differences therebetween.

Cr12⇒Lr12⇒Di2H⇒Cs2⇒Mos1H

Cr13⇒Lr13⇒Di3H⇒Cs3⇒Cs2⇒Mos1H

Cr14⇒Lr14⇒Di4H⇒Cs4⇒Cs3⇒Cs2⇒Mos1H

As shown above, energy is transferred from the smoothing capacitor Cs1 to the smoothing capacitors Cs2, Cs3 and Cs4 by the charge-discharge of the capacitors Cr12, Cr13 and Cr14. Furthermore, the voltage V1 input across the voltage terminals VL and Vcom is converted into about four times higher boosted voltage V2 for output across the terminals VH and Vcom. Since the respective capacitors Cr12, Cr13 and Cr14 are connected in series to the respective inductors Lr12, Lr13 and Lr14 to comprise the LC serial bodies LC12, LC13 and LC14, the transfer of the energy uses a resonant phenomenon, and thus a large amount of energy can be transferred efficiently.

Currents I12, I13 and I14 flowing through the respective serial bodies LC12, LC13 and LC14 are almost the same as the case of the first embodiment. In the present embodiment, too, since the LC serial bodies LC12, LC13 and LC14 are connected between the middle terminals of the inverter circuit for driving A1 and the remaining respective rectifier circuits A2, A3 and A4 like the first embodiment, this can reduce current rating of the inductors Lr and the capacitors Cr of the LC serial bodies LC12, LC13 and LC14 for transfer of energy and thus the inductors Lr and the capacitors Cr can be small-sized.

Moreover, since the rectifier circuits A2 to A4 adopt the diodes in the present embodiment, conduction loss is increased relative to a case of adopting MOSFETs, but instead there is no need of voltage sources or circuits for driving.

The respective column circuits X, Y and Z operate as described above. And the gate signals for driving the respective column circuits X, Y and Z have the same cycle T (where T is a resonant cycle determined by the LC serial body) and the gate signals also are out of phase with each other by T/3(2π/3(rad)) like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the present embodiment as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by 2π/n(rad) among the column circuits is the most effective. And the more the number n of the column circuits is, the less the ripple currents flow through the smoothing capacitors Cs1, Cs2, Cs3 and Cs4.

Sixth Embodiment

A DC/DC power conversion device according to the sixth embodiment will now be described.

Figure 8:
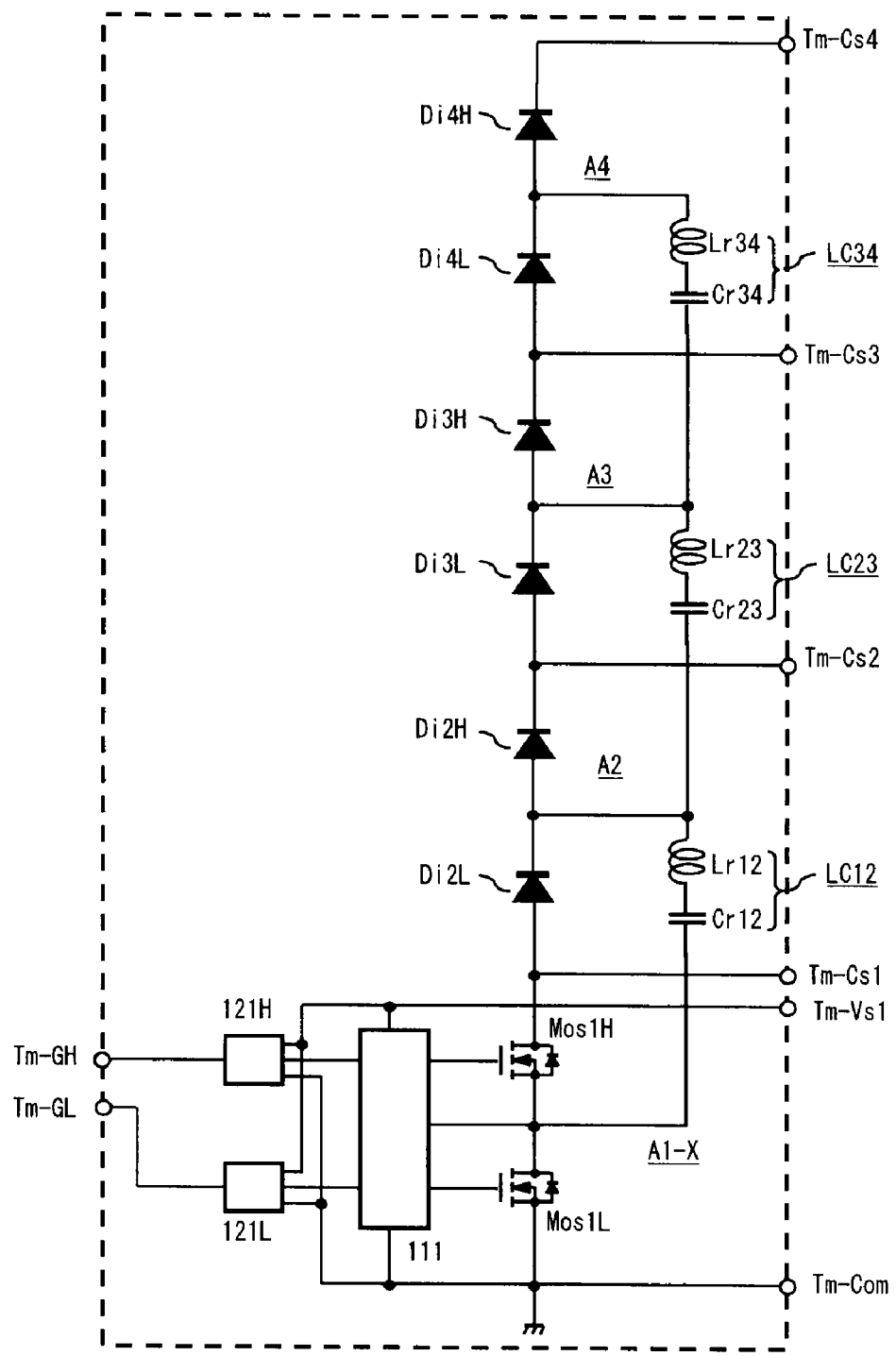
FIG. 8 is a block diagram to represent a circuital structure of a DC/DC power conversion device according to a sixth embodiment.

A circuital structure of the DC/DC power conversion device according to the present embodiment is different from that shown in FIG. 7 of the fifth embodiment in structures of respective column circuits X, Y and Z, and thus structures of the column circuits X, Y and Z are shown in FIG. 8. Remaining structures are the same as those shown in FIG. 7.

Like the fifth Embodiment, each of the column circuits X, Y and Z is a DC/DC converter having a function to convert the voltage V1 input across the voltage terminals VL and Vcom into the boosted voltage V2 about four times higher than the voltage V1 for output across the voltage terminals VH and Vcom, and is comprised of circuits A1 to A4 of a plurality of stages (in this case, four stages).

As shown in FIG. 8, the circuit A1 among the four-stage circuits is an inverter circuit for driving constructed by, in the same manner as the fifth embodiment, connecting in series two MOSFETs Mos1L and Mos1H as a low voltage sided element and as a high voltage sided element and by connecting in series them between both ends of the smoothing capacitor Cs1. The circuits A2 to A4 are rectifier circuits constructed by connecting in series respective two diodes Di2L and Di2H, Di3L and Di3H, and Di4L and Di4H as a low voltage sided element and as a high voltage sided element and by connecting in series them between both ends of the respective smoothing capacitor Cs2, Cs3 and Cs4 (Refer to FIG. 7). The circuits A1, A2, A3 and A4 of four stages are connected in series, and respective LC serial bodies LC12, LC23 and LC34 are comprised of capacitors Cr12, Cr23 and Cr34 and inductors Lr12, Lr23 and Lr 34 connected in series and play a part in transferring energy. The LC serial bodies LC12, LC23 and LC34 are connected between two middle terminals such as middle terminals corresponding to contact points of two elements (MOSFETs or diodes) in each circuit A1, A2, A3 and A4. The LC serial bodies are connected between the two middle terminals of the respective adjacent circuits, that is, A1 and A2, A2 and A3, and A3 and A4. A resonant cycle determined by an inductance of the inductor Lr and a capacitance of the capacitor Cr in each stage is set to be the same in every stage.

Moreover, the column circuit X (Y and Z) includes gate driving circuit 111 and photocouplers 121L and 121H for driving the MOSFETs in the circuit A1, and further includes gate signal input terminals Tm-GL and Tm-GH and power input terminals or terminals for connection of the smoothing capacitors Tm-Com, Tm-Vs1 and Tm-Cs1 to Tm-Cs4.

Each MOSFET is a power MOSFET with a parasitic diode formed between a source and a drain thereof.

Subsequently, the operation thereof will be described.

The capacitances of the smoothing capacitors Cs1, Cs2, Cs3 and Cs4 are set to be sufficiently larger than those of the capacitors Cr of the LC serial bodies LC12, LC13 and LC14. The voltage V1 input across the voltage terminals VL and Vcom is converted into about four times higher boosted voltage V2 for output across the voltage terminals VH and Vcom and a load is connected between the voltage terminal VH and Vcom, and thus the voltage V2 has a lower value than 4×V1. In the steady state, the smoothing capacitor Cs1 is charged with the voltage V1 and the smoothing capacitors Cs2, Cs3 and Cs4 are charged with an average voltage of (V2−V1)/3.

The inverter circuit for driving A1 transfers energy input across the voltage terminals VL and Vcom to the high voltage side depending on turn-on and turn-off operations of the MOSFETs Mos1L and Mos1H, and the rectifier circuits A2, A3 and A4 rectify currents driven by the inverter circuit for driving A1 and transfer energy to the high voltage side.

The gate signals GateL (GateL-X, GateL-Y, GateL-Z) and GateH (GateH-X, GateH-Y, GateH-Z) for two MOSFETs Mos1L and Mos1H are generated in the same manner as the first embodiment, and currents flowing from the sources to the drains thereof in the first embodiment flow through the respective diodes in the rectifier circuits A2 to A4 in a forward direction in the present embodiment.

When the MOSFET Mos1L of the circuit A1 turns on by the gate signal GateL for the low voltage sided MOSFET, some energy accumulated in the smoothing capacitors Cs1, Cs2 and Cs3 is transferred to the capacitors Cr12, Cr23 and Cr34 via paths as described below, due to voltage differences therebetween.

Cs1⇒Di2L⇒Lr12⇒Cr12⇒Mos1L

Cs1⇒Cs2⇒Di3L⇒Lr23⇒Cr23⇒Lr12⇒Cr12⇒Mos1L

Cs1⇒Cs2⇒Cs3⇒Di4L⇒Lr34⇒Cr34⇒Lr23⇒Cr23
⇒Lr12⇒Cr12⇒Mos1L

Subsequently, when the MOSFET Mos1H of the circuit A1 turns on by the gate signal GateH for the high voltage sided MOSFET, energy accumulated in the capacitors Cr12, Cr23 and Cr34 is transferred to the smoothing capacitors Cs2, Cs3 and Cs4 via paths as described below, due to voltage differences therebetween.

Mos1H⇒Cr12⇒Lr12⇒Di2H⇒Cs2

Mos1H⇒Cr12⇒Lr12⇒Cr23⇒Lr23⇒Di3H⇒Cs3⇒Cs2

Mos1H⇒Cr12⇒Lr12⇒Cr23⇒Lr23⇒Cr34⇒Lr34
⇒Di4H⇒Cs4⇒Cs3⇒Cs2

As shown above, energy is transferred from the smoothing capacitor Cs1 to the smoothing capacitors Cs2, Cs3 and Cs4 by the charge-discharge of the capacitors Cr12, Cr23 and Cr34. Furthermore, the voltage V1 input across the voltage terminals VL and Vcom is converted into about four times higher boosted voltage V2 for output across the terminals VH and Vcom. Since the respective capacitors Cr12, Cr23 and Cr34 are connected in series to the respective inductors Lr12, Lr23 and Lr34 to comprise the LC serial bodies LC12, LC23 and LC34, the transfer of the energy uses a resonant phenomenon, and thus a large amount of energy can be transferred efficiently.

In the present embodiment, since the LC serial bodies LC12, LC23 and LC34 are connected between the adjacent circuits, compared with the case of connecting the LC serial bodies LC12, LC13 and LC14 between the inverter circuit for driving A1 and the remaining respective rectifier circuits A2, A3 and A4, currents flowing through the LC serial bodies are increased, but the applied voltage across the capacitor Cr34 can be reduced to ⅓ relative to that across the capacitor Cr14 and the applied voltage across the capacitor Cr23 can be reduced to ½ relative to that across the capacitor Cr13.

Moreover, since the rectifier circuits A2 to A4 adopt the diodes in the present embodiment, conduction loss is increased relative to a case of adopting MOSFETs, but instead there is no need of voltage sources or circuits for driving.

The respective column circuits X, Y and Z operate as described above. And the gate signals for driving the respective column circuits X, Y and Z have the same cycle T (where T is a resonant cycle determined by the LC serial body) and the gate signals also are out of phase with each other by T/3(2π/3(rad)) like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the present embodiment as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by 2π/n(rad) among the column circuits is the most effective. And the more the number n of the column circuits is, the less the ripple currents flow through the smoothing capacitors Cs1, Cs2, Cs3 and Cs4.

Seventh Embodiment

A DC/DC power conversion device according to the seventh embodiment will now be described.

Figure 9:
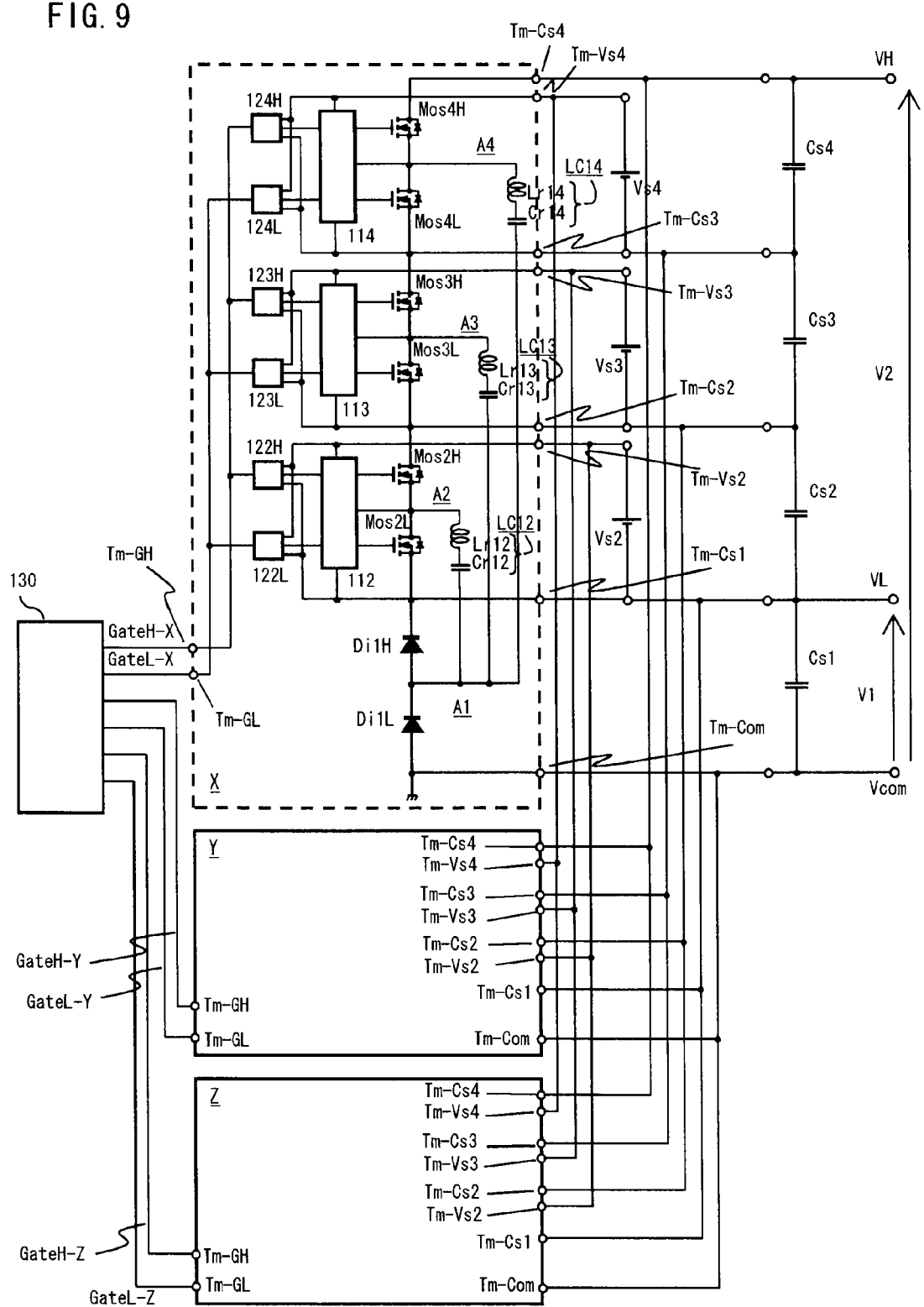
FIG. 9 is a block diagram to represent a circuital structure of a DC/DC power conversion device according to a seventh embodiment.

FIG. 9 is a block diagram to represent a circuital structure of a DC/DC power conversion device according to the seventh embodiment.

As shown in FIG. 9, the DC/DC power conversion device includes three column circuits X, Y and Z each comprised of circuits A1 to A4 of a plurality of stages (in this case, four stages), voltage sources Vs2 to Vs4 for driving, smoothing capacitors Cs1, Cs2, Cs3 and Cs4 for smoothing input and output voltages and further for functioning as voltage sources for energy transfer, a control circuit 130, and input and output voltage terminals Vcom, VL and VH. The DC/DC power conversion device has a function to convert a voltage V2 input across the voltage terminals VH and Vcom into a deboosted voltage V1 about a fourth time lower than the voltage V2 for output across the voltage terminals VL and Vcom.

Each of the column circuits X, Y and Z is a DC/DC converter having a function to convert the voltage V2 input across the voltage terminals VH and Vcom into about a fourth time lower deboosted voltage V1 for output across the voltage terminals VL and Vcom, the description of which will be made below. For convenience of explanation, although a circuital structure for the column circuit X is only shown, those for the column circuits Y and Z are the same, too.

As shown in FIG. 9, the circuit A2 to A4 among the four-stage circuits are inverter circuits for driving constructed by connecting in series respective two MOSFETs Mos2L and Mos2H, Mos3L and Mos3H, and Mos4L and Mos4H as a low voltage sided element and as a high voltage sided element and by connecting in series them between both ends of the respective smoothing capacitors Cs2, Cs3 and Cs4. The circuit A1 is a rectifier circuit constructed by connecting in series two diodes Di1L and Di1H as a low voltage sided element and as a high voltage sided element and by connecting in series them between both ends of the smoothing capacitor Cs1.

Respective LC serial bodies LC12, LC13 and LC14 are comprised of capacitors Cr12, Cr13 and Cr14 and inductors Lr12, Lr13 and Lr 14 connected in series and play a part in transferring energy. The LC serial bodies LC12, LC13 and LC14 are connected between two middle terminals such as middle terminals corresponding to contact points of two elements (MOSFETs or diodes) in each circuit A1, A2, A3 and A4. The LC serial bodies are connected between the two middle terminals of the circuit A1 comprising a predetermined one circuit and the remaining respective circuits A2, A3 and A4. A resonant cycle determined by an inductance of the inductor Lr and a capacitance of the capacitor Cr in each stage is set to be the same in every stage.

Each MOSFET is a power MOSFET with a parasitic diode formed between a source and a drain thereof.

Moreover, the column circuit X (Y and Z) includes gate driving circuit 112 to 114 and photocouplers 122L and 122H to 124L and 124H for driving the MOSFETs in the inverter circuits for driving A2 to A4, and further includes gate signal input terminals Tm-GL and Tm-GH and power input terminals or terminals for connection of the smoothing capacitors Tm-Com, Tm-Vs2 to Tm-Vs4 and Tm-Cs1 to Tm-Cs4.

The voltage sources Vs2, Vs3 and Vs4 shared by the respective column circuits X, Y and Z are provided for driving the MOSFETs of the respective column circuits X, Y and Z, the gate driving circuit 112 to 114 and the photocouplers 122L and 122H to 124L and 124H, with respect to the source terminals of the MOSFETs Mos2L, Mos3L and Mos4L.

The control circuit 130 outputs the gate signals GateL-X and GateH-X, GateL-Y and GateH-Y, and GateL-Z and GateH-Z to the respective column circuits X, Y and Z for operation of the respective column circuits X, Y and Z.

Subsequently, the operation thereof will be described.

The capacitances of the smoothing capacitors Cs1, Cs2, Cs3 and Cs4 are set to be sufficiently larger than those of the capacitors Cr12, Cr13 and Cr14 of the LC serial bodies LC12, LC13 and LC14. Since the respective column circuits X, Y and Z are DC/DC power converters with a function to convert the voltage V2 input across the voltage terminals VH and Vcom into about a fourth time lower voltage V1 for output across the voltage terminals VL and Vcom, a load is connected between the voltage terminal VL and Vcom, and thus the voltage V2 has a higher value than 4×V1. In the steady state, the smoothing capacitor Cs1 is charged with the voltage V1 and the smoothing capacitors Cs2, Cs3 and Cs4 are charged with an average voltage of (V2−V1)/3.

Although the gate signals GateL (GateL-X, GateL-Y, GateL-Z) and GateH (GateH-X, GateH-Y, GateH-Z) for the MOSFETs in the inverter circuits for driving A2 to A4 are generated in the same manner as the second embodiment, currents flowing from the sources to the drains of the MOSFETs in the rectifier circuit A1 in the second embodiment flow through the respective diodes in the rectifier circuit A1 in a forward direction in the present embodiment.

When the high voltage sided MOSFETs Mos2H, Mos3H and Mos4H of the inverter circuits for driving A2 to A4 turn on by the gate signals GateH (GateH-X, GateH-Y, GateH-Z) for the high voltage sided MOSFETs, some energy accumulated in the smoothing capacitors Cs2, Cs3 and Cs4 is transferred to the capacitors Cr12, Cr13 and Cr14 via paths as described below, due to voltage differences therebetween.

Cs2⇒Cs3⇒Cs4⇒Mos4H⇒Lr14⇒Cr14⇒Di1H

Cs2⇒Cs3⇒Mos3H⇒Lr13⇒Cr13⇒Di1H

Cs2⇒Mos2H⇒Lr12⇒Cr12⇒Di1H

Subsequently, when the low voltage sided MOSFETs Mos2L, Mos3L and Mos4L of the inverter circuits for driving A2 to A4 turn on by the gate signals GateL (GateL-X, GateL-Y, GateL-Z) therefor, energy accumulated in the capacitors Cr12, Cr13 and Cr14 is transferred to the smoothing capacitors Cs 1, Cs2 and Cs3 via paths as described below, due to voltage differences therebetween.

Cr14⇒Lr14⇒Mos4L⇒Cs3⇒Cs2⇒Cs1⇒Di1L

Cr13⇒Lr13⇒Mos3L⇒Cs2⇒Cs1⇒Di1L

Cr12⇒Lr12⇒Mos2L⇒Cs1⇒Di1L

As shown above, energy is transferred from the smoothing capacitors Cs2, Cs3 and Cs4 to the smoothing capacitor Cs1 by the charge-discharge of the capacitors Cr12, Cr13 and Cr14. Furthermore, the voltage V2 input across the voltage terminals VH and Vcom is converted into about a fourth time lower deboosted voltage V1 for output across the terminals VL and Vcom. Since the respective capacitors Cr12, Cr13 and Cr14 are connected in series to the respective inductors Lr12, Lr13 and Lr14 to comprise the LC serial bodies LC12, LC13 and LC14, the transfer of the energy uses a resonant phenomenon, and thus a large amount of energy can be transferred efficiently.

In the present embodiment, too, since the LC serial bodies LC12, LC13 and LC14 are connected between the rectifier circuit A1 and the remaining respective inverter circuits for driving A2, A3 and A4 like the second embodiment, this can reduce current rating of the inductors Lr and the capacitors Cr of the LC serial bodies LC12, LC13 and LC14 for transfer of energy and the inductors Lr and the capacitors Cr can be small-sized.

Moreover, since the rectifier circuit A1 adopts the diodes in the present embodiment, conduction loss is increased relative to a case of adopting MOSFETs, but instead there is no need of voltage sources or circuits for driving.

The respective column circuits X, Y and Z operate as described above. And the gate signals for driving the respective column circuits X, Y and Z have the same cycle T (where T is a resonant cycle determined by the LC serial body) and the gate signals also are out of phase with each other by T/3(2π/3(rad)) like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the present embodiment as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by 2π/n(rad) among the column circuits is the most effective. And the more the number n of the column circuits is, the less the ripple currents flow through the smoothing capacitors Cs1, Cs2, Cs3 and Cs4.

Eighth Embodiment

A DC/DC power conversion device according to the eighth embodiment will now be described.

Figure 10:
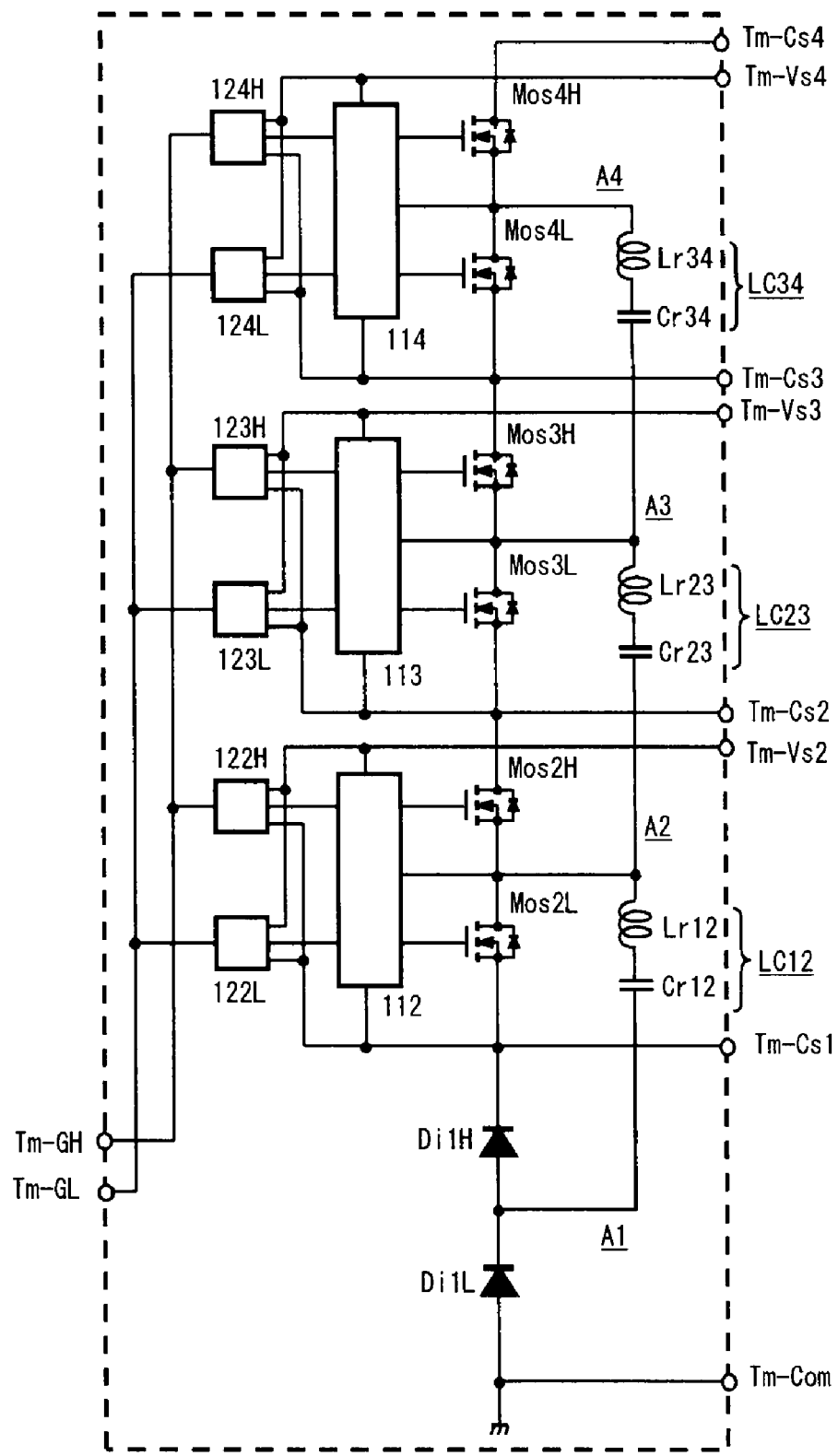
FIG. 10 is a block diagram to represent a circuital structure of a DC/DC power conversion device according to an eighth embodiment.

A circuital structure of the DC/DC power conversion device according to the present embodiment is different from that shown in FIG. 9 of the seventh embodiment in structures of respective column circuits X, Y and Z, and the structures of the column circuits X, Y and Z are shown in FIG. 10. Remaining structures are the same as those shown in FIG. 9.

Like the seventh embodiment, each of the column circuits X, Y and Z is a DC/DC converter having a function to convert the voltage V2 input across the voltage terminals VH and Vcom into the deboosted voltage V1 about a fourth time lower than the voltage V2 for output across the voltage terminals VL and Vcom, and is comprised of circuits A1 to A4 of a plurality of stages (in this case, four stages).

As shown in FIG. 10, the circuit A2 to A4 among the four-stage circuits are constructed by connecting in series respective two MOSFETs Mos2L and Mos2H, Mos3L and Mos3H, and Mos4L and Mos4H as a low voltage sided element and as a high voltage sided element and by connecting in series them between both ends of the respective smoothing capacitors Cs2, Cs3 and Cs4. The circuit A1 is constructed by connecting in series two diodes Di1L and Di1H as a low voltage sided element and as a high voltage sided element and by connecting in series them between both ends of the smoothing capacitor Cs1 (Refer to FIG. 9). The circuits A1, A2, A3 and A4 of four stages are connected in series, and respective LC serial bodies LC12, LC23 and LC34 are comprised of capacitors Cr12, Cr23 and Cr34 and inductors Lr12, Lr23 and Lr 34 connected in series and play a part in transferring energy. The LC serial bodies LC12, LC23 and LC34 are connected between two middle terminals such as middle terminals corresponding to contact points of two elements (MOSFETs or diodes) in each circuit A1, A2, A3 and A4. And the two middle terminals are in the respective adjacent circuits, that is, A1 and A2, A2 and A3, and A3 and A4. A resonant cycle determined by an inductance of the inductor Lr and a capacitance of the capacitor Cr in each stage is set to be the same in every stage.

Moreover, the column circuit X (Y and Z) includes gate driving circuit 112 to 114 and photocouplers 122L and 122H to 124L and 124H for driving the MOSFETs in the circuits A2 to A4, and further includes gate signal input terminals Tm-GL and Tm-GH and power input terminals or terminals for connection of the smoothing capacitors Tm-Com, Tm-Vs2 to Tm-Vs4 and Tm-Cs1 to Tm-Cs4.

Each MOSFET is a power MOSFET with a parasitic diode formed between a source and a drain thereof.

In this case, the circuit A4 in the respective column circuits X, Y and Z operates as an inverter circuit for driving, the circuit A1 operates as a rectifier circuit to rectify currents driven by the inverter circuit for driving and to transfer energy to a low voltage side, and each of the circuits A2 and A3 functions as both an inverter circuit for driving and a rectifier circuit.

The operation of the column circuits X, Y and Z will now be described.

The capacitances of the smoothing capacitors Cs1, Cs2, Cs3 and Cs4 are set to be sufficiently larger than those of the capacitors Cr12, Cr13 and Cr14 of the LC serial bodies. Since the respective column circuits X, Y and Z are DC/DC converter having a function that the voltage V2 input across the voltage terminals VH and Vcom is converted into a fourth time lower deboosted voltage V1 for output across the voltage terminals VL and Vcom, a load is connected between the voltage terminal VL and Vcom, and thus the voltage V2 has a higher value than 4×V1. In the steady state, the smoothing capacitor Cs1 is charged with the voltage V1 and the smoothing capacitors Cs2, Cs3 and Cs4 are charged with an average voltage of (V2−V1)/3.

Although the gate signals GateL (GateL-X, GateL-Y, GateL-Z) and GateH (GateH-X, GateH-Y, GateH-Z) for the MOSFETs in the circuits A2 to A4 are generated in the same manner as the second embodiment, currents flowing from the sources to the drains of the MOSFETs in the rectifier circuit A1 in the second embodiment flow through the respective diodes in the rectifier circuit A1 in a forward direction in the present embodiment.

When the high voltage sided MOSFETs Mos2H, Mos3H and Mos4H of the circuits A2 to A4 turn on by the gate signals GateH (GateH-X, GateH-Y, GateH-Z) for the high voltage sided MOSFETs, some energy accumulated in the smoothing capacitors Cs2, Cs3 and Cs4 is transferred to the capacitors Cr12, Cr23 and Cr34 via paths as described below, due to voltage differences therebetween.

Cs2⇒Cs3⇒Cs4⇒Mos4H⇒Lr34⇒Cr34⇒Lr23⇒Cr23
⇒Lr12⇒Cr12⇒Di1H

Cs2⇒Cs3⇒Mos3H⇒Lr23⇒Cr23⇒Lr12⇒Cr12⇒Di1H

Cs2⇒Mos2H⇒Lr12⇒Cr12⇒Di1H

Subsequently, when the low voltage sided MOSFETs Mos2L, Mos3L and Mos4L of the respective circuits A2 to A4 turn on by the gate signals GateL (GateL-X, GateL-Y, GateL-Z), energy accumulated in the smoothing capacitors Cr12, Cr23 and Cr34 is transferred to the capacitors Cs1, Cs2 and Cs3 via paths as described below, due to voltage differences therebetween.

Cr12⇒Lr12⇒Cr23⇒Lr23⇒Cr34⇒Lr34⇒Mos4L⇒Cs3
⇒Cs2⇒Cs1⇒Di1L

Cr12⇒Lr12⇒Cr23⇒Lr23⇒Mos3L⇒Cs2⇒Cs1⇒Di1L

Cr12⇒Lr12⇒Mos2L⇒Cs1⇒Di1L

As shown above, energy is transferred from the smoothing capacitors Cs2, Cs3 and Cs4 to the smoothing capacitor Cs1 by the charge-discharge of the capacitors Cr12, Cr23 and Cr34. Furthermore, the voltage V2 input across the voltage terminals VH and Vcom is converted into about a fourth time lower deboosted voltage V1 for output across the terminals VL and Vcom. Since the respective capacitors Cr12, Cr23 and Cr34 are connected in series to the respective inductors Lr12, Lr23 and Lr34 to comprise the LC serial bodies LC12, LC23 and LC34, the transfer of the energy uses a resonant phenomenon, and thus a large amount of energy can be transferred efficiently.

In the present embodiment, since the LC serial bodies LC12, LC23 and LC34 are connected between the adjacent circuits, compared with the case of connecting the LC serial bodies LC12, LC13 and LC14 between the circuit A1 and the remaining respective circuits A2, A3 and A4, currents flowing through the LC serial bodies are increased, but the applied voltage across the capacitor Cr34 can be reduced to ⅓ relative to that across the capacitor Cr14 and the applied voltage across the capacitor Cr23 can be reduced to ½ relative to that across the capacitor Cr13.

Moreover, since the rectifier circuit A1 adopts the diodes in the present embodiment, conduction loss is increased relative to a case of adopting MOSFETs, but instead there is no need of voltage sources or circuits for driving.

The respective column circuits X, Y and Z operate as described above. And the gate signals for driving the respective column circuits X, Y and Z have the same cycle T (where T is a resonant cycle determined by the LC serial body) and the gate signals also are out of phase with each other by $T/3(2\pi/3(\text{rad}))$ like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the present embodiment as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by $2\pi/n(\text{rad})$ among the column circuits is the most effective. And the more the number n of the column circuits is, the less the ripple currents flow through the smoothing capacitors Cs1, Cs2, Cs3 and Cs4.

Ninth Embodiment

A DC/DC power conversion device according to the ninth embodiment will now be described.

Figure 11:
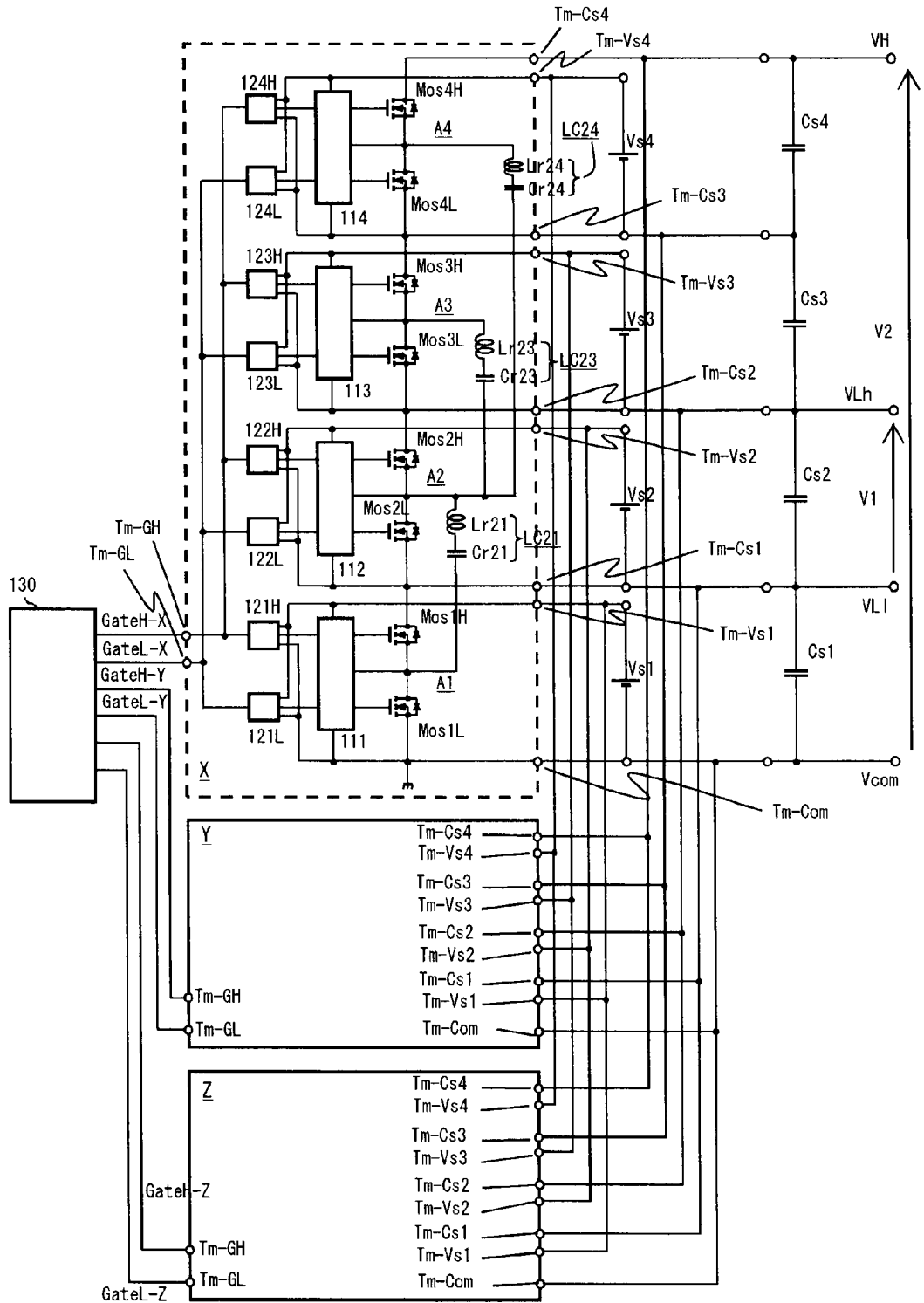
FIG. 11 is a block diagram to represent a circuital structure of a DC/DC power conversion device according to a ninth embodiment.

FIG. 11 is a block diagram to represent a circuital structure of a DC/DC power conversion device according to the ninth embodiment.

As shown in FIG. 11, the DC/DC power conversion device includes three column circuits X, Y and Z each comprised of circuits A1 to A4 of a plurality of stages (in this case, four stages), voltage sources Vs1 to Vs4 for driving, smoothing capacitors Cs1, Cs2, Cs3 and Cs4 for smoothing input and output voltages and further for functioning as voltage sources for energy transfer, a control circuit 130, and input and output voltage terminals Vcom, VL1, VLh and VH.

In the present embodiment, connection structure of LC serial bodies and input and output voltage terminals disposed in the circuits A1 to A4 is different from that shown in FIG. 1. In other words, the voltage terminal VLh connected to the high voltage sided terminal of the smoothing capacitor Cs2 and the voltage terminal VL1 connected to the low voltage sided terminal of the smoothing capacitor Cs2 are provided, and a voltage V1 inputs across the voltage terminals VLh and VL1. Respective LC serial bodies LC21, LC23 and LC24 are comprised of capacitors Cr21, Cr23 and Cr24 and inductors Lr21, Lr23 and Lr24 connected in series and play a part in transferring energy. The LC serial bodies LC21, LC23 and LC24 are connected between middle terminals of the circuit A2 comprising a predetermined one circuit and the remaining respective circuits A1, A3 and A4. A resonant cycle determined by an inductance of the inductor Lr and a capacitance of the capacitor Cr in each stage is set to be the same in every stage. The DC/DC power conversion device has a function to convert the voltage V1 input across the voltage terminals VLh and VL1 into the boosted voltage V2 about four times higher than the voltage V1 for output across the voltage terminals VH and Vcom.

The operations of the column circuits X, Y and Z will now be described.

Each of the column circuits X, Y and Z is a DC/DC converter having a function to convert the voltage V1 input across the voltage terminals VLh and VL1 into the boosted voltage V2 about four times higher than the voltage V1 for output across the voltage terminals VH and Vcom. The circuit A2 operates as an inverter circuit for driving to transfer energy input across the voltage terminals VLh and VL1 to the high voltage side and the low voltage side by on and off operations of the MOSFETs Mos2L and Mos2H. The circuits A1, A3 and A4 operate as rectifier circuits to rectify currents driven by the inverter circuit A2 for driving and to transfer energy.

Although the gate signals GateL (GateL-X, GateL-Y, GateL-Z) and GateH (GateH-X, GateH-Y, GateH-Z) for MOSFETs in the circuits A1 to A4 are generated in the same manner as the first embodiment, currents flow from the drains to the sources in the MOSFETs of the inverter circuit for driving A2 and currents flow from the source to the drains in the MOSFETs of the rectifier circuits A1, A3 and A4.

The capacitances of the smoothing capacitors Cs1, Cs2, Cs3 and Cs4 are set to be sufficiently larger than those of the capacitors Cr21, Cr23 and Cr24 of the LC serial bodies. The voltage V1 input across the voltage terminals VLh and VL1 is converted into about four times higher boosted voltage V2 for output across the voltage terminals VH and Vcom, and a load is connected between the voltage terminal VH and Vcom, and thus the voltage V2 has a lower value than 4×V1. In the steady state, the smoothing capacitor Cs2 is charged with the voltage V1 and the smoothing capacitors Cs1, Cs3 and Cs4 are charged with an average voltage of (V2−V1)/3.

When the low voltage sided MOSFETs Mos1L, Mos2L, Mos3L and Mos4L of the respective circuits A1 to A4 turn on by the gate signals GateL (GateL-X, GateL-Y, GateL-Z) therefor, some energy accumulated in the smoothing capacitors Cs2 and Cs3 is transferred to the capacitors Cr23 and Cr24 and energy accumulated in the capacitor Cr21 is transferred to the smoothing capacitor Cs1 via paths as described below, due to voltage differences therebetween.

Cs2 ⇒ Mos3L ⇒ Lr23 ⇒ Cr23 ⇒ Mos2L

Cr21 ⇒ Lr21 ⇒ Mos2L ⇒ Cs1 ⇒ Mos1L

Cs2 ⇒ Cs3 ⇒ Mos4L ⇒ Lr24 ⇒ Cr24 ⇒ Mos2L

When the high voltage sided MOSFETs Mos1H, Mos2H, Mos3H and Mos4H of the respective circuits A1 to A4 turn on by the gate signals GateH (GateH-X, GateH-Y, GateH-Z) for the high voltage sided MOSFETs, energy accumulated in the capacitors Cr23 and Cr24 is transferred to the smoothing capacitors Cs3 and Cs4 and some energy accumulated in the smoothing capacitor Cs2 is transferred to the capacitor Cr21 via paths as described below, due to voltage differences therebetween.

Cr23 ⇒ Lr23 ⇒ Mos3H ⇒ Cs3 ⇒ Mos2H

Cs2 ⇒ Mos2H ⇒ Lr21 ⇒ Cr21 ⇒ Mos1H

Cr24 ⇒ Lr24 ⇒ Mos4H ⇒ Cs4 ⇒ Cs3 ⇒ Mos2H

As shown above, energy is transferred from the smoothing capacitor Cs2 to the smoothing capacitors Cs1, Cs3 and Cs4 by the charge-discharge of the capacitors Cr21, Cr23 and Cr24. Furthermore, the voltage V1 input across the voltage terminals VLh and VL1 is converted into about four times higher boosted voltage V2 for output across the terminals VH and Vcom. Since the respective capacitors Cr21, Cr23 and Cr24 are connected in series to the respective inductors Lr21, Lr23 and Lr24 to comprise the LC serial bodies LC21, LC23 and LC24, the transfer of the energy uses a resonant phenomenon, and thus a large amount of energy can be transferred efficiently.

Moreover, since the rectifier circuits A1, A3 and A4 adopt the MOSFETs in the present embodiment, conduction loss can be reduced and also efficiency of power conversion can be increased relative to a case of adopting diodes.

In the present embodiment, the LC serial bodies LC21, LC23 and LC24 are connected between the inverter circuit for driving A2 and the remaining respective rectifier circuits A1, A3 and A4, and both terminals of the smoothing capacitor Cs2 are connected to the low voltage sided terminals VLh and VLl which are input terminals. With this, the values of currents flowing through the respective LC serial bodies LC21, LC23 and LC24 are set to be the same as the minimum value, and thereby reducing the current values, like the first embodiment. This can reduce current rating of the inductor Lr and the capacitor Cr of the LC serial bodies LC21, LC23 and LC24 for energy transfer and thus can make the inductor Lr and the capacitor Cr small-sized.

While the voltage V1 is input across both ends of the smoothing capacitor Cs1 in the first embodiment, the voltage V1 is input across both ends of the smoothing capacitor Cs2 in the circuit A2 interposed between the different circuits. When voltages across the capacitors Cr12, Cr13 and Cr14 of the LC serial bodies LC12, LC13 and LC14 are referred to as "V12r, V13r and V14r," respectively, in the first embodiment, and voltages across the capacitors Cr21, Cr23 and Cr24 in the LC serial bodies LC21, LC23 and LC24 are referred to as "V21, V23 and V24," respectively, in the present embodiment, it gives:

$V12r:V13r:V14r=1:2:3$ $V21:V23:V24=1:1:2$ $V21=V23=V12r$

As shown above, the voltage V1 is input across both ends of the smoothing capacitor Cs2 in the circuit A2 interposed between the different circuits, and thereby the voltages across the capacitors of the LC serial bodies can be reduced. This can reduce voltage rating of the capacitors Cr21, Cr23 and Cr24 more and thus can make the capacitors more small-sized than the first embodiment.

The respective column circuits X, Y and Z operate as described above. And the gate signals for driving the respective column circuits X, Y and Z have the same cycle T (where T is a resonant cycle determined by the LC serial body) and the gate signals also are out of phase with each other by $T/3(2\pi/3(rad))$ like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the present embodiment as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by $2\pi/n(rad)$ among the column circuits is the most effective. And the more the number n of the column circuits is, the less the ripple currents flow through the smoothing capacitors Cs1, Cs2, Cs3 and Cs4.

Tenth Embodiment

Though the ninth embodiment represents a voltage boost typed DC/DC power conversion device which boosts the voltage V1 into about four times higher voltage V2, the present embodiment represents a voltage deboost typed DC/DC power conversion device which deboosts the voltage V2 into the voltage V1.

The circuital structure of the DC/DC power conversion device according to the present embodiment is the same as that shown in FIG. 11; in this case, however, circuits A1, A3 and A4 in the respective column circuits X, Y and Z operate as inverter circuits for driving, a circuit A2 operates as a rectifier circuit to rectify currents driven by the inverter circuits for driving and to transfer energy to a low voltage side.

The operations of the respective column circuits X, Y and Z will be described.

Although the gate signals GateL (GateL-X, GateL-Y, GateL-Z) and GateH (GateH-X, GateH-Y, GateH-Z) for MOSFETs in the circuits A1 to A4 are generated in the same manner as the second embodiment, currents flow from the drains to the sources in the MOSFETs of the inverter circuits for driving A1, A3 and A4, and flow from the source to the drains in the MOSFETs of the rectifier circuit A2.

The capacitances of the smoothing capacitors Cs1, Cs2, Cs3 and Cs4 are set to be sufficiently larger than those of the capacitors Cr21, Cr23 and Cr24 of the LC serial bodies. Since the respective column circuits X, Y and Z are DC/DC converters having a function to convert the voltage V2 input across the voltage terminals VH and Vcom into about a fourth time lower deboosted voltage V2 for output across the voltage terminals VLh and VLl, a load is connected between the voltage terminal VLh and VLl, and thus the voltage V2 has a higher value than 4×V1. In the steady state, the smoothing capacitor Cs2 is charged with the voltage V1 and the smoothing capacitors Cs1, Cs3 and Cs4 are charged with an average voltage of (V2−V1)/3.

When the low voltage sided MOSFETs Mos1L, Mos2L, Mos3L and Mos4L of the respective circuits A1 to A4 turn on by the gate signals GateL (GateL-X, GateL-Y, GateL-Z) therefor, energy accumulated in the capacitors Cr23 and Cr24 is transferred to the smoothing capacitors Cs2 and Cs3 and some energy accumulated in the smoothing capacitor Cs1 is transferred to the capacitor Cr21 via paths as described below, due to voltage differences therebetween.

Cr23⇒Lr23⇒Mos3L⇒Cs2⇒Mos2L

Cs1⇒Mos2L⇒Lr21⇒Cr21⇒Mos1L

Cr24⇒Lr24⇒Mos4L⇒Cs3⇒Cs2⇒Mos2L

When the high voltage sided MOSFETs Mos1H, Mos2H, Mos3H and Mos4H of the respective circuits A1 to A4 turn on by the gate signals GateH (GateH-X, GateH-Y, GateH-Z) for the high voltage sided MOSFETs, some energy accumulated in the smoothing capacitors Cs3 and Cs4 is transferred to the capacitors Cr23 and Cr24 and energy accumulated in the capacitor Cr21 is transferred to the smoothing capacitor Cs2 via paths as described below, due to voltage differences therebetween.

Cs3⇒Mos3H⇒Lr23⇒Cr23⇒Mos2H

Cr21⇒Lr21⇒Mos2H⇒Cs2⇒Mos1H

Cs3⇒Cs4⇒Mos4H⇒Lr24⇒Cr24⇒Mos2H

As shown above, energy is transferred from the smoothing capacitors Cs1, Cs3 and Cs4 to the smoothing capacitor Cs2 by the charge-discharge of the capacitors Cr21, Cr23 and Cr24. Furthermore, the voltage V2 input across the voltage terminals VH and Vcom is converted into a fourth time lower deboosted voltage V1 about for output across the terminals VLh and VLl. Since the respective capacitors Cr21, Cr23 and Cr24 are connected in series to the respective inductors Lr21, Lr23 and Lr24 to comprise the LC serial bodies LC21, LC23 and LC24, the transfer of the energy uses a resonant phenomenon, and thus a large amount of energy can be transferred efficiently.

Moreover, since the rectifier circuit A2 adopts the MOS-FETs in the present embodiment, conduction loss can be reduced and also efficiency of power conversion can be increased relative to a case of adopting diodes.

In the present embodiment, the LC serial bodies LC21, LC23 and LC24 are connected between the rectifier circuit A2 and the remaining respective inverter circuits for driving A1, A3 and A4, and both terminals of the smoothing capacitor Cs2 are connected to the low voltage sided terminals VLh and VLl which are output terminals. With this, the values of currents flowing through the respective LC serial bodies LC21, LC23 and LC24 are set to be the same value as the minimum one, and thereby the current values can be reduced like the ninth embodiment. This can reduce current rating of the inductor Lr and the capacitor Cr of the LC serial bodies LC21, LC23 and LC24 for energy transfer and thus the inductor Lr and the capacitor Cr can be small-sized.

The voltage V1 is output across both ends of the smoothing capacitor Cs2 in the circuit A2 interposed between the different circuits, and thereby the voltages across the capacitors comprising the LC serial bodies can be reduced like the ninth embodiment. This can reduce voltage rating of the capacitors Cr21, Cr23 and Cr24 more and thus can make the capacitors more small-sized than the first embodiment.

The respective column circuits X, Y and Z operate as described above. And the gate signals for driving the respective column circuits X, Y and Z have the same cycle T (where T is a resonant cycle determined by the LC serial body) and the gate signals also are out of phase with each other by T/3(2π/3(rad)) like the first embodiment (Refer to FIG. 3). Three column circuits X, Y and Z each comprised of the four-stage circuits A1, A2, A3 and A4 share the smoothing capacitors Cs1, Cs2, Cs3 and Cs4 to be connected in parallel. With this, charge-discharge timing of the smoothing capacitors Cs1, Cs2, Cs3 and Cs4 become different and the charge-discharge currents flowing to the smoothing capacitors Cs1, Cs2, Cs3 and Cs4 are circulated among the column circuits X, Y and Z as well, and thereby the AC currents (ripple currents) flowing through the smoothing capacitors Cs1, Cs2, Cs3 and Cs4 can be reduced. Such reduction of the ripple currents flowing through the smoothing capacitors increase reliability of the DC/DC power conversion device and efficiency for power conversion, and a structure of the device to be made small-sized like the first embodiment.

In the present embodiment as well as the first embodiment, the number of the column circuits and the phase difference are not limited to those are describe above. An effect of reducing the ripple currents flowing through the smoothing capacitors Cs1, Cs2, Cs3 and Cs4 is acquired by arranging a plurality of (n) column circuits and being out of phase with each other for operation. The driving such as being out of phase with each other by 2π/n(rad) among the column circuits is the most effective. And the more the number n of the column circuits is, the less the ripple currents flow through the smoothing capacitors Cs1, Cs2, Cs3 and Cs4.

Furthermore, although the ninth embodiment represents the voltage boost typed DC/DC power conversion device of V1⇒V2 and the tenth embodiment represents the voltage deboost typed DC/DC power conversion device of V2⇒V1, energy transfer in both directions can be realized by including both of two functions of the ninth and tenth embodiments for carrying out the invention. In this case, if V1×4>V2, an operation of boosting voltage is performed like the third embodiment, and, if V1×4<V2, an operation of deboosting voltage is performed like the forth embodiment carrying out the invention.

The boosting-deboosting DC/DC power conversion device controlled as described above obtains the same effects as the first and second embodiments carrying out the invention and also can be used widely due to realization of energy transfer in both directions.

Although the input and output terminals of the voltage V1 are connected to both ends of the smoothing capacitor Cs2 of the circuit A2 in the ninth and tenth embodiments for carrying out the invention, the terminals of the voltage V1 have only to be connected to both ends of a smoothing capacitor in a circuit interposed between different circuits, for example, they may be connected to both ends of the smoothing capacitor Cs3. In this case, the respective LC serial bodies are connected between the circuit A3 and the respective different circuits A1, A2 and A4.

Like the ninth and tenth embodiments for carrying out the invention, the structure of connecting the input and output terminals of the voltage V1 to both ends of the smoothing capacitor in the circuit interposed between the different circuits, among the circuits A1 to A4 of a plurality of stages, may be adopted to the third and forth embodiments for carrying out the invention. In other words, the LC serial bodies are connected between the respective adjacent circuits, (A1, A2) (A2, A3) and (A3, A4) and then the input and output terminals of the voltage V1 are connected to both ends of the smoothing capacitor Cs2 in the circuit A2. In such case, when the currents flowing through the LC serial bodies LC12, LC23 and LC34 are referred to as "I12r, I23r and I34r," respectively, in the mode of inputting the voltage V1 to both ends of the smoothing capacitor Cs1 (in the third and forth embodiments for carrying out the invention), and the currents flowing therethrough are referred to as "I12, I23 and I34," respectively, in the mode of inputting the voltage V1 to both ends of the smoothing capacitor Cs2 like the present embodiment, it gives:

$I12r:I23r:I34r=3:2:1$ $I12:I23:I34=1:2:1$ $I12=I34=I34r$

Accordingly, voltages across the capacitors of the LC serial bodies can be reduced and also currents flowing through the LC serial bodies can be reduced as described above, thereby the inductors of the LC serial bodies can be smaller. Furthermore, an effect of reducing the ripple currents flowing through the smoothing capacitors Cs1, Cs2, Cs3 and Cs4 is acquired by arranging a plurality of (n) column circuits and being out of phase with each other for operation of the column circuits.

For the column circuits with the structure of connecting the input and output terminals to both ends of the smoothing capacitor in the circuit interposed between the different circuits, among the circuits A1 to A4 of a plurality of stages, each circuit operating as a rectifier circuit may be comprised of two diodes connected in series as a low voltage sided element and a high voltage sided element, as shown in the fifth and eighth embodiments for carrying out the invention.

The capacitors used to energy transfer are connected in series to the inductors to construct the LC serial bodies connected between the respective circuits of the circuits A1 to A4 of a plurality of stages in the respective first to tenth embodiments for carrying out the invention. And those energy transfers are performed using energy phenomenon. Instead, energy may be transferred using only the capacitors with no inductors, and a plurality of column circuits constructed as such share the smoothing capacitors Cs1, Cs2, Cs3 and Cs4 to be connected in parallel. The column circuits have the same driving cycle and are out of phase with each other for driving the DC/DC power conversion device, and thus an effect of reducing the ripple currents flowing through the smoothing capacitors Cs1, Cs2, Cs3 and Cs4 similarly to the respective embodiments for carrying out the invention. In this case, too, when the number of the column circuits is n, the driving such as being out of phase with each other by $2\pi/n$(rad) among the column circuits is the most effective.

Although the DC/DC power conversion devices with a boosting and deboosting voltage ratio of 4 have been described in the respective embodiments for carrying out the invention, in those where the number of stages of circuits comprising the respective column circuits is modified and the boosting and deboosting voltage ratio is changed, the respective embodiments described above may be adopted to obtain the same effect.

Moreover, although power MOSFETs with parasitic diodes formed between sources and drains thereof have been adopted as switching elements of the inverter circuits for driving and the rectifier circuits in the respective embodiments for carrying out the invention, other semiconductor elements capable of controlling on and off operations by control electrodes such as IGBT, and so on, may be adopted, and, in such case, diodes connected in inverse parallel are used, which function as the parasitic diodes of the power MOSFETs.

Moreover, although a plurality of column circuits X, Y and Z connected in parallel have the same structures in the first to tenth embodiments for carrying out the invention described above, they may have different structures, for example, the column circuit X may have the circuital structure represented in the first embodiment and the column circuits Y and Z may have the circuital structure represented in the third embodiment. In such case, the number of stages of the circuits comprising the respective column circuits is set to be identical and the charge-discharge currents flowing through the respective smoothing capacitors are circulated among the column circuits effectively, thereby the ripple currents flowing through the smoothing capacitors can be reduced effectively.

Eleventh Embodiment

A DC/DC power conversion device according to the eleventh embodiment will be described, which has a different number of stages of circuits each comprising a plurality of circuits.

Figure 12:
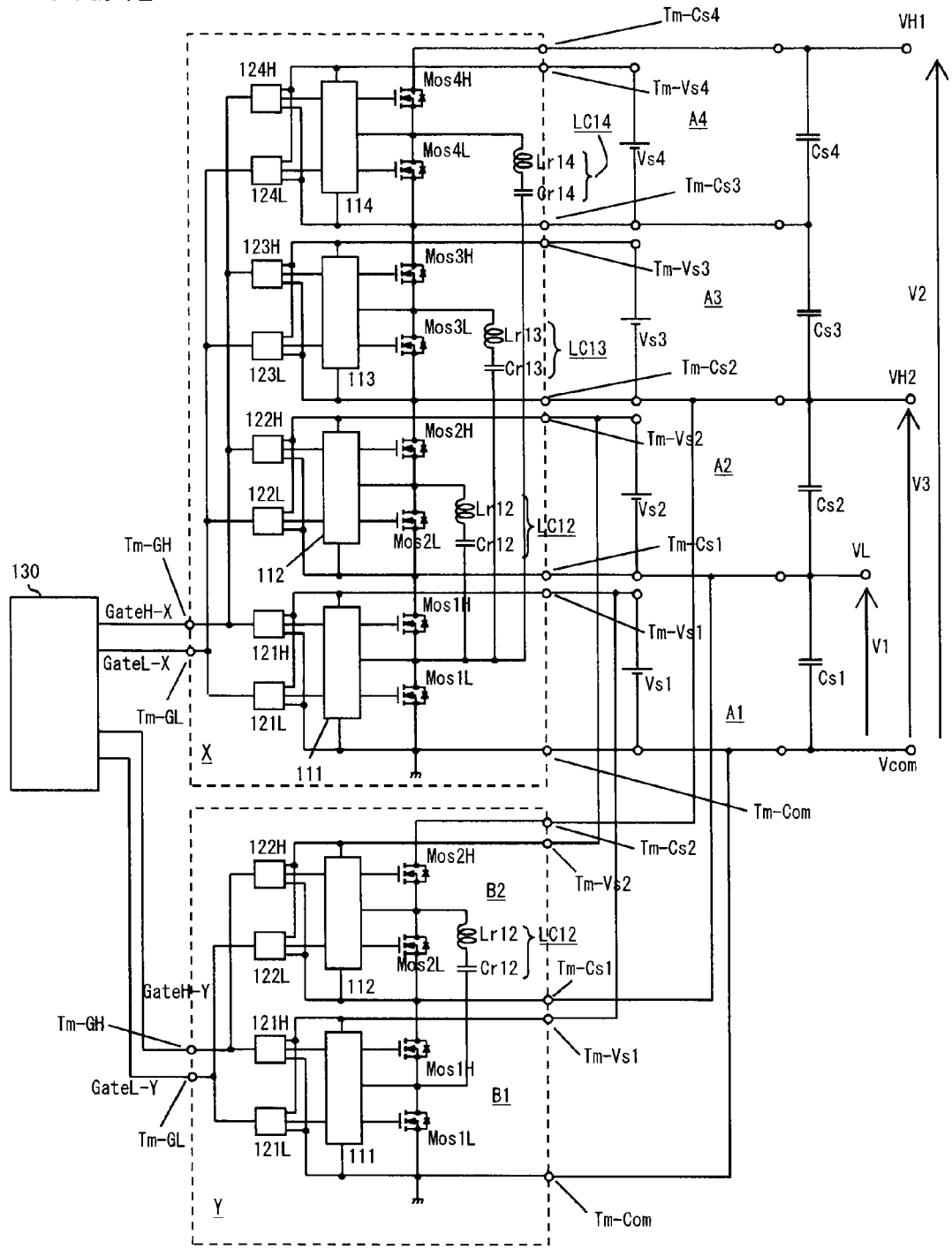
FIG. 12 is a block diagram to represent a circuital structure of a DC/DC power conversion device according to a eleventh embodiment.

FIG. 12 is a block diagram to represent a circuital structure of a DC/DC power conversion device according to the eleventh embodiment.

As shown in FIG. 12, the DC/DC power conversion device includes a column circuit X comprised of circuits A1 to A4 of four stages, a column circuit Y comprised of circuits B1 and B2 of two stages, voltage sources Vs1 to Vs4 for driving, smoothing capacitors Cs1, Cs2, Cs3 and Cs4 for smoothing input and output voltages and further for functioning as voltage sources for energy transfer, a control circuit 130, and input and output voltage terminals Vcom, VL, VH1 and VH2.

The structure of the column circuit X is the same that in the first embodiment.

The column circuit Y is constructed by connecting in series two MOSFETs Mos1L and Mos1H, Mos2L and Mos2H as a low voltage sided element and a high voltage sided element, and by connecting in series the two-stage circuits B1 and B2 connected between both ends of the respective smoothing capacitors Cs1 and Cs2. An LC serial body LC12 is comprised of a capacitor Cr12 and an inductor Lr12 connected in series and plays a part in transferring energy. The LC serial body LC12 is connected between two middle terminals such as middle terminals corresponding to respective contact points of two MOSFETs in each circuit B1 and B2 and a middle terminal between two circuits B1 and B2. A resonant cycle determined by an inductance of the inductor and a capacitance of the capacitor of the LC serial body is set to be the same as that determined by the respective LC serial bodies disposed in the column circuit X. Each MOSFET is a power MOSFET with a parasitic diode formed between a source and a drain thereof.

Moreover, the column circuit Y includes gate driving circuits 111 and 112 and photocouplers 121L and 121H, and 122L and 122H for driving the MOSFETs in the respective circuits B1 and B2, and further includes gate signal input terminals Tm-GL and Tm-GH and power input terminals or terminals for connection of the smoothing capacitors Tm-Com, Tm-Vs1, Tm-Vs2, Tm-Cs1 and Tm-Cs2.

The input and output voltage terminals Vcom and VL are connected to both terminals of the smoothing capacitor Cs1 like the first embodiment, the voltage terminal VH1 is connected to the high voltage sided terminal of the smoothing capacitor Cs4, and the voltage terminal VH2 is connected to the high voltage sided terminal of the smoothing capacitor Cs2 (the low voltage sided terminal of the smoothing capacitor Cs3).

In the DC/DC power conversion device constructed as such, the voltage V1 is input across the voltage terminals VL and Vcom, the boosted voltage V2 four times higher than the voltage V1 is output across the voltage terminals VH1 and Vcom, and also the boosted voltage V3 twice higher than the voltage V1 is output across the voltage terminals VH2 and Vcom.

The control circuit 130 outputs the gate signals (GateL-X, GateH-X) and (GateL-Y, GateH-Y) to the respective column circuits X and Y for operation thereof. The gate signals to the respective column circuits X and Y are the same as those in the first embodiment, and the operations of the column circuit X is the same as the description in the first embodiment.

The operation of the column circuit Y will be described.

The circuit B1 operates as an inverter circuit for driving and the circuit B2 operates as a rectifier circuit.

A value of voltage V3 is set to be lower than 2×V1. In the steady state, the smoothing capacitor Cs1 is charged with the voltage V1 and the smoothing capacitor Cs2 is charged with an average value of (V3−V1).

When the low voltage sided MOSFETs Mos1L and Mos2L of the respective circuits B1 and B2 turn on by the gate signal GateL-Y for the low voltage sided MOSFETs, some energy accumulated in the smoothing capacitor Cs1 is transferred to the capacitor Cr12 via a path as described below, due to voltage differences therebetween.

Cs1⇒Mos2L⇒Lr12⇒Cr12⇒Mos1L

Subsequently, when the high voltage sided MOSFETs Mos1H and Mos2H of the respective circuits B1 and B2 turn on by the gate signal GateH-Y for the high voltage sided MOSFETs, energy accumulated in the capacitors Cr12 is transferred to the smoothing capacitor Cs2 via a path as described below, due to voltage differences therebetween.

Cr12⇒Lr12⇒Mos2H⇒Cs2⇒Mos1H

As shown above, in the column circuit Y, energy is transferred from the smoothing capacitor Cs1 to the smoothing capacitors Cs2 by the charge-discharge of the capacitors Cr12. Furthermore, the voltage V1 input across the voltage terminals VL and Vcom is converted into about twice higher boosted voltage V3 for output across the terminals VH2 and Vcom. Since each capacitor Cr12 is connected in series to the inductor Lr12 to comprise the LC serial body LC12, the transfer of the energy uses a resonant phenomenon, and thus a large amount of energy can be transferred efficiently.

Moreover, since the rectifier circuit B2 adopts the MOSFETs in the present embodiment as well, conduction loss can be reduced and also efficiency of power conversion can be increased relative to a case of adopting diodes.

The respective column circuits X and Y operate as described above. And the gate signals for driving the respective column circuits X and Y have the same cycle T (where T is a resonant cycle determined by the LC serial body) and the gate signals also are out of phase with each other by T/2(2π/2(rad)). Two column circuits X and Y share the smoothing capacitors Cs1 and Cs2, and thereby the AC currents (ripple currents) flowing through the smoothing capacitors Cs1 and Cs2 can be reduced. Such reduction of the ripple currents flowing through the smoothing capacitors increase reliability of the DC/DC power conversion device and efficiency for power conversion, and a structure of the device to be made small-sized.

Since the number of the circuits disposed between the voltage terminals VH2 and Vcom is plural (2), in case of output power of the voltage V3 larger than that of the voltage V1, power consumption for the DC/DC power conversion device can be reduced to restrict the heat-emission.

Various modifications and alterations of this invention will be apparent to those skilled in the art without departing from the scope and spirit of this invention, and it should be understood that this is not limited to the illustrative embodiments set forth herein.

What is claimed is:

1. A DC/DC power conversion device comprising:
a plurality of smoothing capacitors; and
n column circuits, n is an integer of 2 or more, sharing the plurality of smoothing capacitors to be connected in parallel, each column circuit comprising:
a plurality of circuits formed by connecting in series inverter circuit(s) for driving and rectifier circuit(s), wherein each inverter circuit is formed by connecting in series a high voltage sided element and a low voltage sided element, each element is made of semiconductor switching element, and by connecting them between both terminals of the smoothing capacitor, and
each rectifier circuit is formed by connecting in series a high voltage sided element and a low voltage sided element, each element is made of a semiconductor switching element or a diode element, and by connecting them between both terminals of the smoothing capacitor; and
capacitors for energy transfer connected respectively between the circuits in such manner that each capacitor is connected between two middle terminals such as middle terminals corresponding to contact points of the high voltage sided elements and the low voltage sided elements in the respective circuits,
wherein driving signals for the respective column circuits have the same driving cycle and are out of phase with each other.

2. The DC/DC power conversion device according to claim 1, wherein phases of the respective driving signals for driving the n column circuits are different from each other by 2π/n.

3. The DC/DC power conversion device according to claim 1, wherein the number of the plurality of circuits of the respective column circuits are same.

4. The DC/DC power conversion device according to claim 1, wherein the capacitors for energy transfer are connected respectively between the respective adjacent circuits in the plurality of circuits.

5. The DC/DC power conversion device according to claim 1, wherein input or output voltage terminals are connected to the both terminals of the smoothing capacitor of a predetermined circuit among the plurality of circuits, and the predetermined circuit is connected between the other circuits of the plurality of circuits to be disposed in a middle position, in the respective column circuits.

6. The DC/DC power conversion device according to claim 1, wherein input or output voltage terminals are connected to the both terminals of the smoothing capacitor of a predetermined one circuit among the plurality of circuits, and the respective capacitors are connected respectively between the predetermined one circuit and the respective other circuits, in the respective column circuits.

7. The DC/DC power conversion device according to claim 6, wherein both ends of the predetermined one circuit are connected to the other circuits to be disposed in a middle position.

8. The DC/DC power conversion device according to claim 1, wherein inductors are connected in series to the capacitors for energy transfer.

9. The DC/DC power conversion device according to claim 8, wherein a plurality of serial bodies each comprised of the capacitor for energy transfer and the inductor, interposed between the circuits, have the same resonant cycle determined by capacitances of the capacitors and inductances of the inductors.

10. The DC/DC power conversion device according to claim 1, wherein each of the semiconductor switching elements is a power MOSFET with a parasitic diode formed between a source and a drain thereof or a semiconductor switching element with diodes connected in inverse parallel.

* * * * *